United States Patent
Takemoto et al.

(10) Patent No.: US 10,057,149 B2
(45) Date of Patent: Aug. 21, 2018

(54) DELAY MEASURING DEVICE, MEASUREMENT OBJECT DEVICE AND COMMUNICATION SYSTEM

(71) Applicant: Mitsubishi Electric Corporation, Chiyoda-ku (JP)

(72) Inventors: Yuta Takemoto, Tokyo (JP); Kazuo Kubo, Tokyo (JP); Yoshiaki Konishi, Tokyo (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 0 days.

(21) Appl. No.: 15/500,673

(22) PCT Filed: Sep. 15, 2015

(86) PCT No.: PCT/JP2015/076177
§ 371 (c)(1),
(2) Date: Jan. 31, 2017

(87) PCT Pub. No.: WO2016/043193
PCT Pub. Date: Mar. 24, 2016

(65) Prior Publication Data

US 2017/0237639 A1    Aug. 17, 2017

(30) Foreign Application Priority Data

Sep. 16, 2014 (JP) ................. 2014-187441

(51) Int. Cl.
*H04L 12/26* (2006.01)
*H04Q 11/00* (2006.01)

(52) U.S. Cl.
CPC ..... *H04L 43/0864* (2013.01); *H04Q 11/0066* (2013.01); *H04L 2212/00* (2013.01); *H04Q 2011/0083* (2013.01)

(58) Field of Classification Search
CPC ..... H04L 43/0864; H04L 12/28; H04L 29/14; H04L 2212/00; H04Q 11/0066; H04Q 2011/0083
See application file for complete search history.

(56) References Cited

U.S. PATENT DOCUMENTS 6,192,406 B1 * 2/2001 Ma ..................... H04L 47/10
709/226
6,757,255 B1 * 6/2004 Aoki ................... H04L 1/187
370/229

(Continued)

FOREIGN PATENT DOCUMENTS

JP  2006-42334 A   2/2006
JP  2008-182549 A  8/2008

(Continued)

OTHER PUBLICATIONS

Extended European Search Report dated Jul. 12, 2017 in European Patent Application No. 15841976.2.

(Continued)

*Primary Examiner* — Wutchung Chu
(74) *Attorney, Agent, or Firm* — Oblon, McClelland, Maier & Neustadt, L.L.P.

(57) ABSTRACT

A delay measuring device of a communication system that includes the delay measuring device sequentially transmitting and receiving frames having a known frame length, and a measurement object device serving as an object for measuring a round trip time by the delay measuring device, includes: an RTT measuring unit to measure a round trip time with respect to the measurement object device a number of times using information for delay measurement in the frame; an RTT change detection unit to detect a change of a value of the round trip time based on the values of the round trip time thus measured; and an RTT determination unit to determine a value of the round trip time to be (Continued)

adopted, from among the values of the round trip time, based on the change of a value of the round trip time.

15 Claims, 23 Drawing Sheets

(56) References Cited

U.S. PATENT DOCUMENTS

| | | | | |
|---|---|---|---|---|
| 7,304,951 | B2* | 12/2007 | Rhee | H04L 29/06 370/235 |
| 7,468,947 | B2* | 12/2008 | Mannal | H04L 47/10 370/236 |
| 8,971,355 | B2* | 3/2015 | Ohbi | H04N 5/765 370/503 |
| 2002/0027884 | A1* | 3/2002 | Halme | H04L 43/00 370/253 |
| 2006/0018266 | A1 | 1/2006 | Seo | |
| 2009/0310500 | A1* | 12/2009 | Matsuda | H04L 43/0864 370/252 |
| 2011/0170417 | A1* | 7/2011 | Muramoto | H04L 47/10 370/238 |
| 2012/0213508 | A1 | 8/2012 | Moynihan | |
| 2013/0195442 | A1 | 8/2013 | Murakami et al. | |
| 2015/0131450 | A1* | 5/2015 | Weill | H04W 28/0284 370/237 |

FOREIGN PATENT DOCUMENTS

| | | |
|---|---|---|
| JP | 2009-77207 A | 4/2009 |
| JP | 2010-283662 A | 12/2010 |
| JP | 2013-121014 A | 6/2013 |
| JP | 2013-153367 A | 8/2013 |

OTHER PUBLICATIONS

International Search Report and Written Opinion dated Dec. 15, 2015, in PCT/JP2015/076177, filed Sep. 15, 2015.
"Interfaces for the optical transport network", International Telecommunications Union, ITU-T, G.709/Y.1331, Feb. 2012, 237 pages.
Combined Chinese Office Action and Search Report dated Jan. 29, 2018 in Chinese Patent Application No. 201580049567.0 (with English translation and English translation of Category of Cited Documents), 14 pages.

* cited by examiner

FIG.1

FIG.2
(1): NORMAL STATE
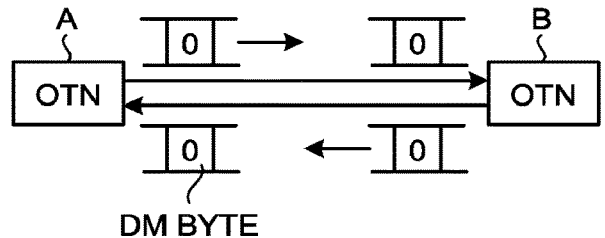
DM BYTE
(2): MEASUREMENT START (t0)
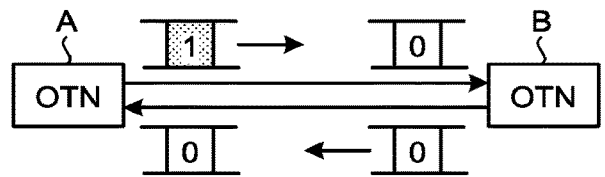
(3): B SIDE RESPONSE
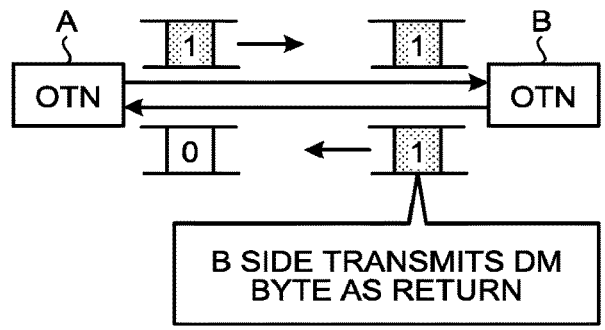
B SIDE TRANSMITS DM BYTE AS RETURN
(4): MEASUREMENT END (t1)
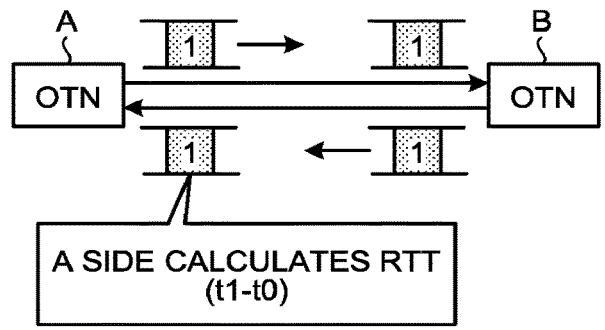
A SIDE CALCULATES RTT (t1-t0)

|  | CONDITION 1 | CONDITION 2 |
|---|---|---|
| FRAME | OTU2 | OTU2 |
| FREQUENCY DEVIATION | 10[ppm] | 40[ppm] |
| MEASUREMENT PERIOD | 1220[ms] | 305[ms] |
| RTT MEASUREMENT RESOLUTION | ±122[ps] | ±488[ps] |

DELAY MEASURING DEVICE, MEASUREMENT OBJECT DEVICE AND COMMUNICATION SYSTEM

FIELD

The present invention relates to a delay measuring device, a measurement object device and a communication system.

BACKGROUND

For a configuration of a wireless base station, there is progressing introduction of MFH (Mobile Front Haul) which employs an optical interface such as CPRI (Common Public Radio Interface), and RHs (Remote Heads) disposed dispersedly, which are each configured to include an antenna, so that digital processing is concentrated into BBU (Base Band Unit). In order to extend a transmission distance of the MFH, there is a technique that utilizes an OTN (Optical Transport Network) frame to encapsulate and transfer a CPRI signal, as defined in Non Patent Literature 1 listed below.

In the CPRI, an acceptable RTT (Round Trip Time) is as short as about 100 µs, and an accuracy in device delay is set to a very strict value, such as +/−16 ns. In a CPRI zone, a delay time is measured by utilizing a CPRI format. As regards a method of encapsulating and transferring a CPRI signal in an OTN frame, for example, Patent Literature 1 listed below discloses a technique of measuring a delay time in an OTN zone in a delay measuring method using a DM (Delay Measurement) byte of an overhead. When the CPRI signal is transferred in the OTN frame, it is desirable to transfer the CPRI signal transparently without changing the CPRI signal on the way.

CITATION LIST

Patent Literature

Patent Literature 1: Japanese Patent Application Laid-open No. 2013-153367

Non Patent Literature

Non Patent Literature 1: ITU-T G.709/Y.1331, February, 2012

SUMMARY

Technical Problem

However, according to the above conventional techniques, when a CPRI signal is transferred in an OTN frame, in the delay measuring method using a DM byte of an overhead the measurement accuracy is restricted by an interval of an OTU (Optical channel Transport Unit) frame that is a frame in an actual transmission format. Consequently, in the OTN, there has been a problem in that the RTT can be measured merely in units of 12 µs in the case of a transmission rate of 10 G bits/s (hereinafter, referred to as 10G), or in units of 50 µs in the case of a transmission rate of 2.5 G bits/s (hereinafter, referred to as 2.5G), and so the resultant resolution is insufficient for CPRI delay measurement.

The present invention has been made in view of the above circumstances, and an object of the present invention is to provide a delay measuring device, a measurement object device and a communication system, which can improve the RTT measurement resolution.

Solution to Problem

In order to solve the above-mentioned problems and achieve the object, the present invention provides a delay measuring device of a communication system that includes the delay measuring device sequentially transmitting and receiving frames having a known frame length, and a measurement object device serving as an object for measuring a round trip time by the delay measuring device, the delay measuring device comprising: a round trip time measuring unit to measure a round trip time with respect to the measurement object device a number of times using information for delay measurement in the frame; a round trip time change detection unit to detect a change of a value of the round trip time, based on a plurality of values of the round trip time thus measured; and a round trip time determination unit to determine a value of the round trip time to be adopted, from among the values of the round trip time, based on the change of a value of the round trip time.

Advantageous Effects of Invention

According to the present invention, there is provided an effect capable of improving the RTT measurement resolution.

BRIEF DESCRIPTION OF DRAWINGS

FIG. 1 is a chart illustrating an ODUk overhead.
FIG. 2 is a chart illustrating an RTT measuring sequence.

DESCRIPTION OF EMBODIMENTS

Embodiments of a delay measuring device, a measurement object device, and a communication system according to the present invention are described below in detail with reference to the drawings. The present invention is not limited to the following embodiments.

First Embodiment

At first, a conventional RTT measuring method will be briefly described to explain how the RTT measurement resolution can be improved.

Figure 1:
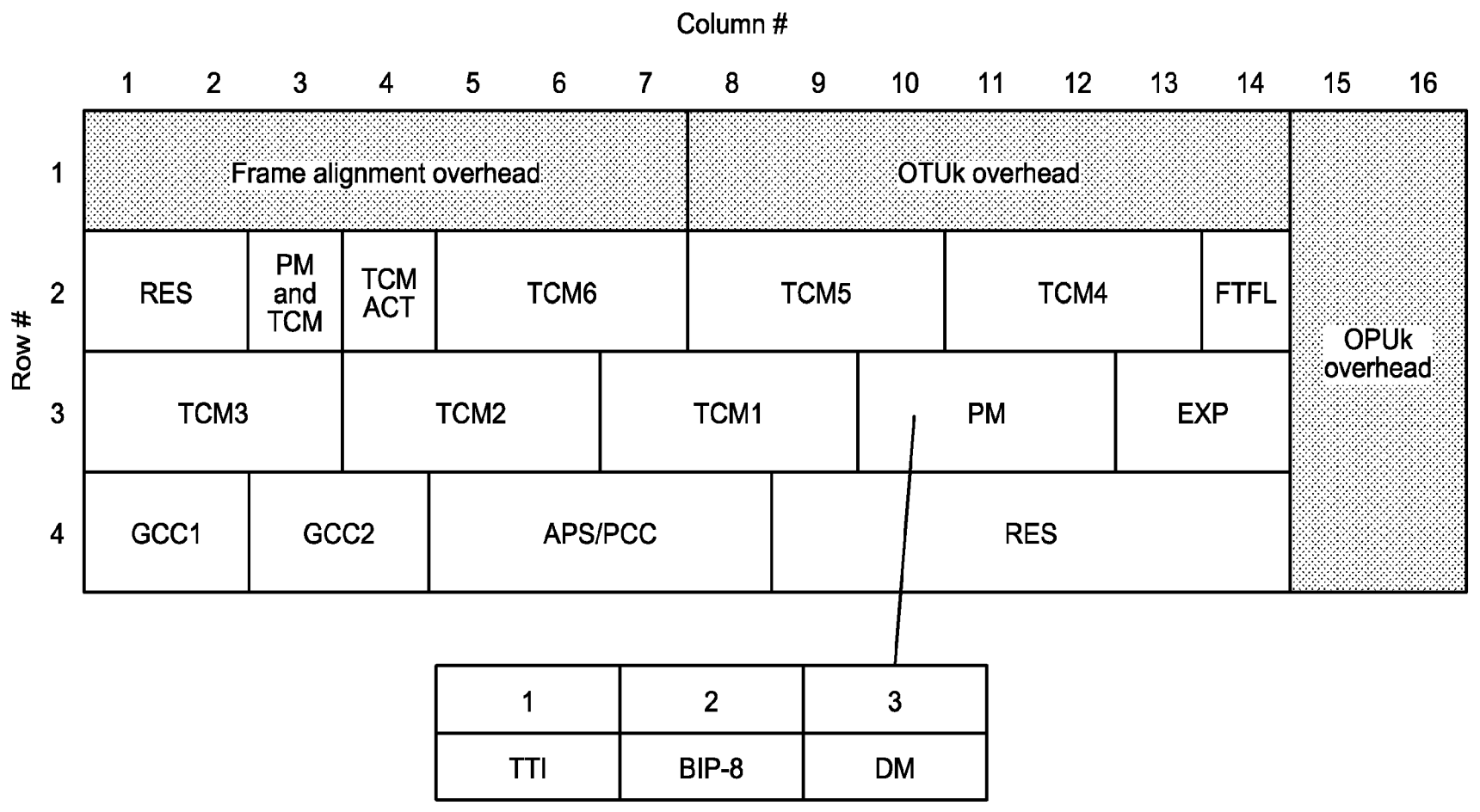

In the case of an OTU frame, an overhead for monitoring control is added to payload data that stores user data, and the OTU frame is transferred in this state. FIG. 1 is a chart illustrating an ODUk (Optical channel Data Unit-k) overhead. In a conventional OTN, a DM byte contained in PM (Path Monitoring) within the ODUk overhead is used to measure an RTT that is a round trip delay in a fashion set out below. FIG. 2 is a chart illustrating an RTT measuring sequence.

(1) In the normal state, an OTN device A on the measurement execution side and an OTN device B that is a measurement object on the return side transmit OTU frames with a DM byte "0".

(2) At a measurement start time point t0, the OTN device A sets "1" in the DM byte of an OTU frame, and transmits it.

(3) Upon receiving the DM byte "1", the OTN device B sets "1" in the DM byte of an OTU frame, and transmits it as a return.

(4) The OTN device A calculates the RTT by subtracting the measurement start time point t0 from the measurement end time point t1 at which it receives the DM byte "1" from the OTN device B.

The DM byte is assigned to a fixed position of the OTU frame. The OTN device B may receive a DM byte "1" from the OTN device A immediately before transmitting a DM byte on an OTU frame from its own device, or may receive a DM byte "1" from the OTN device A immediately after transmitting a DM byte "0" on an OTU frame from its own device. In either case, regardless of the reception timing of the DM byte "1", the OTN device B sends back a DM byte "1" to the OTN device A at the same timing as next transmitting a DM byte on an OTU frame.

The delay measurement accuracy is restricted in units of one OTU frame. The one OTU frame length is 12 μs in the case of 10G, or the one OTU frame length is 50 μs in the case of 2.5G. Therefore, a resolution necessary for CPRI signal delay measurement is insufficient.

Figure 3:
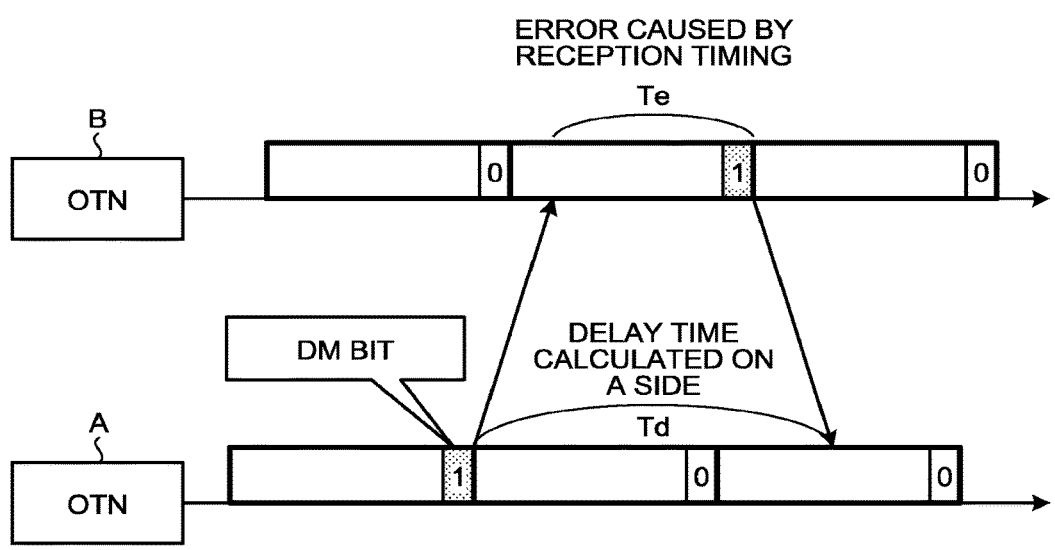
FIG. 3 is a chart illustrating an error in delay time caused by a reception timing.

Here, an error in delay time is caused by the transmission and reception timing of DM bits in the OTU frame. FIG. 3 is a chart illustrating an error in delay time caused by the reception timing. As an error Te due to the reception timing at the OTN device B is larger, a delay time Td, i.e., the RTT, calculated on the OTN device A side grows larger. An error due to the reception timing in the RTT measurement using DM bits is caused only in a direction of increasing the delay. Consequently, in the OTN device A, if the RTT measurement is performed a number of times, the smallest RTT can be considered to be closest to an RTT containing no error caused by the reception timing.

Figure 4:
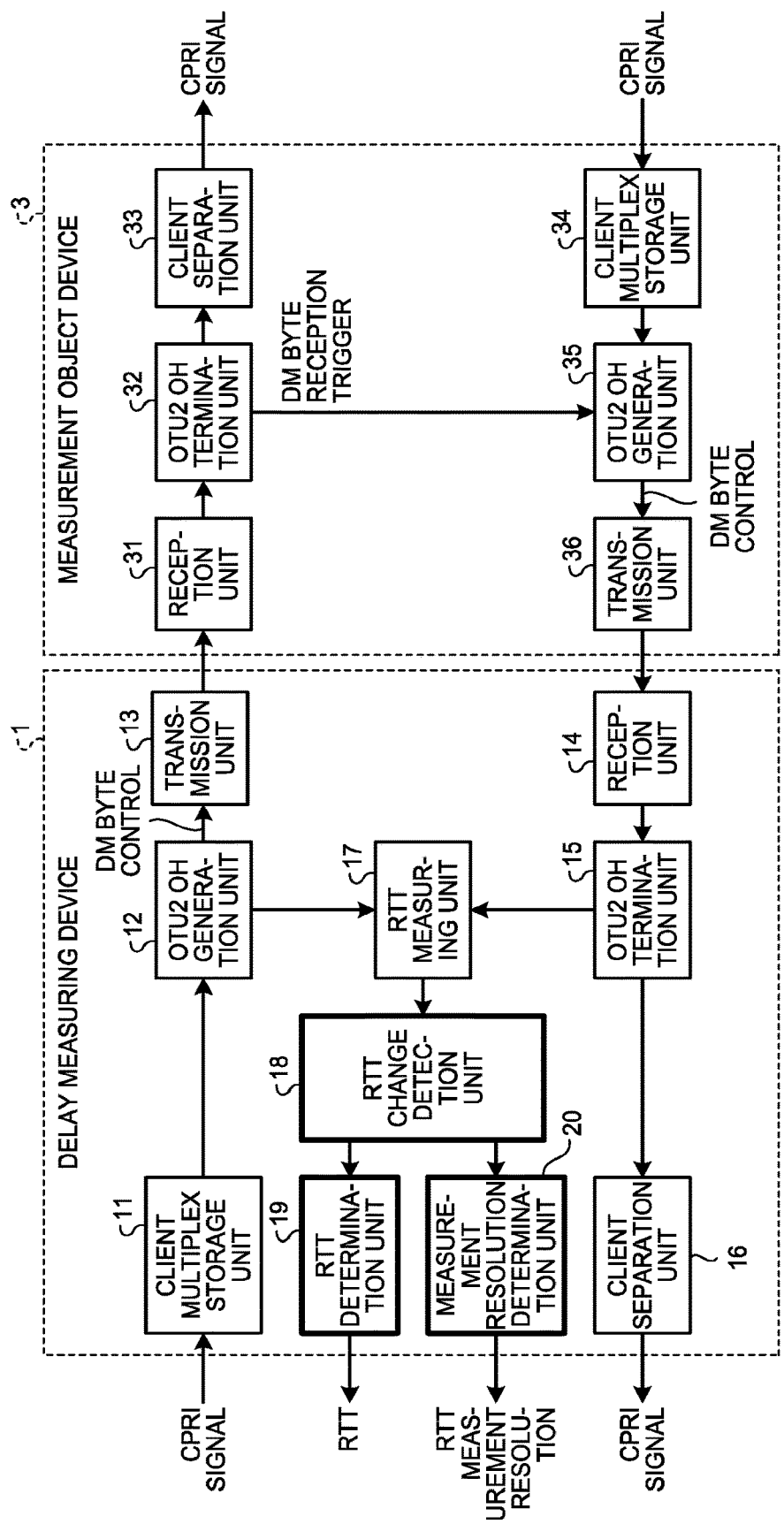
FIG. 4 is a diagram illustrating a configuration example of a communication system according to a first embodiment.

Next, an explanation will be given of a communication system including a delay measuring device and a measurement object device according to this embodiment, in terms of its configuration and operations for RTT measurement. FIG. 4 is a diagram illustrating a configuration example of a communication system according to this embodiment. The communication system is composed of: a delay measuring device 1 that is a communication device for measuring the RTT; and a measurement object device 3 that is a communication device serving as an object for measuring the RTT by the delay measuring device 1 and is configured to transmit a return frame in response to a frame received from the delay measuring device 1.

The delay measuring device 1 includes a Client multiplex storage unit 11, an OTU2 OH (Over Head) generation unit 12, a transmission unit 13, a reception unit 14, an OTU2 OH termination unit 15, a Client separation unit 16, an RTT measuring unit 17, an RTT change detection unit 18, an RTT determination unit 19, and a measurement resolution determination unit 20. As an OTU frame, there are several different types, but here description is given for an OTU2 frame as an example. The same is also applied to the subsequent embodiments.

In the delay measuring device 1, when the Client multiplex storage unit 11 receives, as an input, a CPRI signal from an external device (not shown), it stores the signal in an OTU2 frame in a multiplexed form. The OTU2 OH generation unit 12 generates an overhead containing a DM byte and gives it to the OTU2 frame, and the transmission unit 13 that is transmission means transmits the OTU2 frame to the measurement object device 3. Further, in the delay measuring device 1, when the reception unit 14 that is reception means receives an OTU2 frame from the measurement object device 3, the OTU2 OH termination unit 15 removes the overhead from the OTU2 frame in a termination process, and the Client separation unit 16 separates a CPRI signal from the OTU2 frame and outputs it to an external device (not shown). The operations from the Client multiplex storage unit 11 to the Client separation unit 16 are the same as conventional common operations. Here, the OTU2 OH generation unit 12 controls the value of a DM byte in an overhead to be given to an OTU2 frame to be transmitted.

The RTT measuring unit 17 serves as round trip time measuring means configured: to obtain, from the OTU2 OH generation unit 12, time point information about when an OTU2 frame including a DM byte of an overhead provided with "1" or "0" is transmitted from its own device; to obtain, from the OTU2 OH termination unit 15, time point information about when an OTU2 frame including a DM byte of an overhead provided with "1" or "0" is received from the measurement object device 3; to calculate a difference between the time point information from the OTU2 OH termination unit 15 and the time point information from the OTU2 OH generation unit 12 for the corresponding DM bytes; and thereby to measure the RTT between the delay measuring device 1 and the measurement object device 3.

The RTT change detection unit 18 serves as round trip time change detection means configured to detect an RTT change from a plurality of RTT values that are measurement results measured by the RTT measuring unit 17 a number of times. Further, the RTT change detection unit 18 calculates a frequency deviation in frame transmission frequency between the delay measuring device 1 and the measurement object device 3, from an RTT change amount based on the plurality of RTT values. The RTT change amount is defined by a difference between a current RTT value measured and a neighbor RTT value measured just prior to the current RTT value.

The RTT determination unit 19 serves as round trip time determination means configured to determine, based on the RTT change detected by the RTT change detection unit 18, an RTT value representing an RTT between the delay measuring device 1 and the measurement object device 3, from a number of RTT values, and to output the determined RTT value to an external device (not shown).

The measurement resolution determination unit 20 serves as measurement resolution determination means configured to determine an RTT measurement resolution from the frequency deviation calculated by the RTT change detection unit 18, and to output the determined RTT measurement resolution to an external device (not shown).

The measurement object device 3 includes a reception unit 31 serving as reception means, an OTU2 OH termination unit 32, a Client separation unit 33, a Client multiplex storage unit 34, an OTU2 OH generation unit 35, and a transmission unit 36 serving as transmission means, which have configurations respectively corresponding to the reception unit 14, the OTU2 OH termination unit 15, the Client separation unit 16, the Client multiplex storage unit 11, the OTU2 OH generation unit 12, and the transmission unit 13 included in the delay measuring device 1. Accordingly, description about the configurations of the respective parts of the measurement object device 3 will be omitted. Here, the OTU2 OH generation unit 35 uses acquisition of information about a DM byte, which has been detected by a termination process of the OTU2 OH termination unit 32, as a DM byte reception trigger to control a value of a DM byte in an overhead to be given to an OTU2 frame to be transmitted.

Next, an explanation will be given for operations for RTT measurement in the delay measuring device 1. In the delay measuring device 1, the RTT measuring unit 17 obtains, from the OTU2 OH generation unit 12, time point information about when an OTU2 frame whose overhead DM byte is provided with "1" or "0" is the transmitted, and obtains, from the OTU2 OH termination unit 15, time point information about when an OTU2 frame whose overhead DM byte is provided with "1" or "0" is received.

The RTT measuring unit 17 calculates a difference between the DM byte transmission time point in the OTU2 OH generation unit 12 and the DM byte reception time point corresponding thereto in the OTU2 OH termination unit 15. Specifically, this difference is a difference between the transmission time point of an OTU2 frame including an overhead DM byte provided with "1" and the reception time point of the corresponding OTU2 frame including an overhead DM byte provided with "1", or a difference between the transmission time point of an OTU2 frame including an overhead DM byte provided with "0" and the reception time point of the corresponding OTU2 frame including an overhead DM byte provided with "0". The RTT measuring unit 17 uses the calculated value as an RTT value with respect to the measurement object device 3. A single-time RTT measurement method is the same as a conventional art, but, here, the RTT measuring unit 17 performs the RTT measurement with respect to the measurement object device 3 a number of times according to the above-described calculating method.

Figure 5:
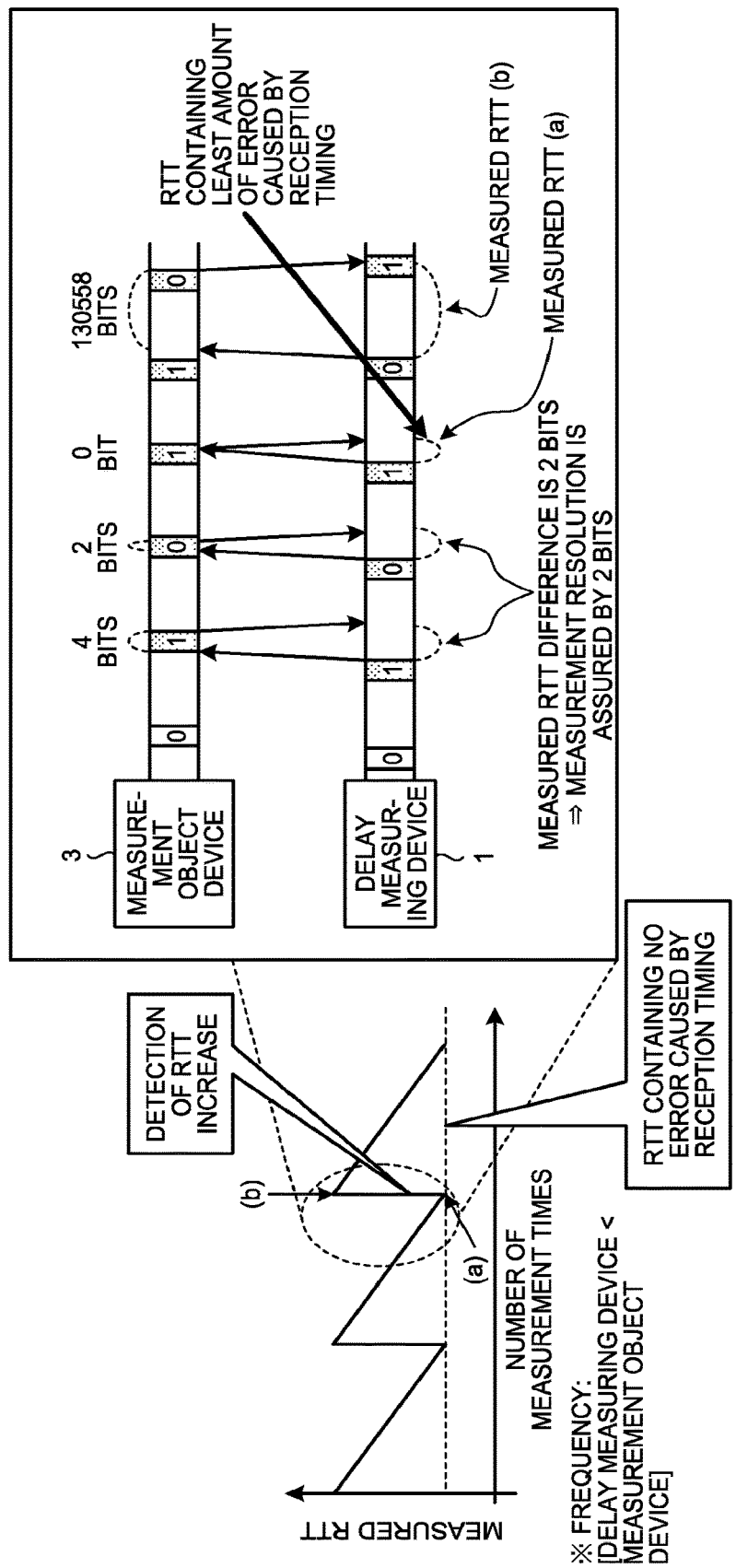
FIG. 5 is a chart illustrating a change of an RTT value measured by an RTT measuring unit.

At this time, RTT values measured by the RTT measuring unit 17 change as illustrated in FIG. 5. FIG. 5 is a chart illustrating change in RTT values measured by the RTT measuring unit 17. Here, as an example, description is given for a case where the OTU2 frame frequency satisfies "delay measuring device 1<measurement object device 3", i.e., a case where the delay measuring device 1 has an OTU2 frame transmission frequency lower than the object device 3. In FIG. 5, the left side chart illustrates the relationship between the number of measurement times and the measured RTTs, and the right side chart illustrates the transmission/reception timing of a DM byte in the delay measuring device 1 and the measurement object device 3 around a measurement timing of (a) and (b) in the left side chart. Here, in the left side chart of FIG. 5, the number of measurement times may be replaced with elapsed time.

In the delay measuring device 1, when the RTT measuring unit 17 measures the RTT a number of times, RTT values repeat continuous decrease and subsequent increase in the RTT value, as illustrated in FIG. 5, such that the increase appears with an approximate time corresponding to a frame length of the OTU2 frame. The increase that appears with an approximate time corresponding to the frame length is an error caused by the reception timing of DM bits in the measurement object device 3. Accordingly, in the delay measuring device 1, when the RTT change detection unit 18 detects an increase in the RTT value, i.e., when it detects the increase in a case where RTT values repeat a change of the continuous decrease and the subsequent increase, the RTT determination unit 19 determines that an RTT value at the timing before detection of the RTT value increase by the RTT change detection unit 18 is the minimum value, i.e., an RTT value containing the least amount of error.

The RTT change detection unit 18 may be configured not only to detect a change in RTT value, i.e., increase or decrease of RTT values, but also to detect the degree of increase or decrease in the form of a change amount. In FIG. 5, when the measured RTT changes from (a) to (b), the RTT change detection unit 18 detects an RTT increase that appears with an approximate time corresponding to the frame length. The RTT determination unit 19 determines that the RTT measured at (a) is an RTT including the least amount of error.

Here, the RTT change detection unit 18 may detect, a number of times, the RTT increase that appears with an approximate time corresponding to the frame length, and the RTT determination unit 19 may regard the smallest RTT, among the RTT measurement results corresponding to (a) of the number of times, as an RTT including the least amount of error. Further, when RTT measurement is performed a number of times over one or more measurement periods, the RTT determination unit 19 may regard the smallest RTT among the RTT measurement results as an RTT including the least amount of error.

Further, in the delay measuring device 1, the RTT change detection unit 18 calculates the frequency deviation in frame transmission frequency between the delay measuring device 1 and the measurement object device 3, from the RTT change amount. For example, as a method of calculating the frequency deviation in the RTT change detection unit 18, the example illustrated in FIG. 5 can calculate the frequency deviation from a change amount based on two RTT values having a state where RTT values continuously decrease. The RTT change detection unit 18 calculates the frequency deviation from a plurality of RTT change amounts, by use of three or more RTT values, thereby making it possible to improve the accuracy of the frequency deviation to be calculated.

The measurement resolution determination unit 20 calculates the RTT measurement resolution of its own device, based on the frequency deviation calculated by the RTT change detection unit 18. Consequently, the delay measuring device 1 can assure a measurement resolution not more than the time corresponding to the frame length, for the detected smallest RTT value.

For example, in the case illustrated in FIG. 5, the RTT measured in the delay measuring device 1 decreases by a time corresponding to 2 bits at every measurement. In this case, the RTT measured and determined as including the least amount of error can be deemed as being measured with a resolution of a time corresponding to 2 bits. Consequently, the delay measuring device 1 can measure the RTT with a particle size finer than the conventional measuring method, and can thereby more accurately calculate a delay time.

Figures 6, 7:
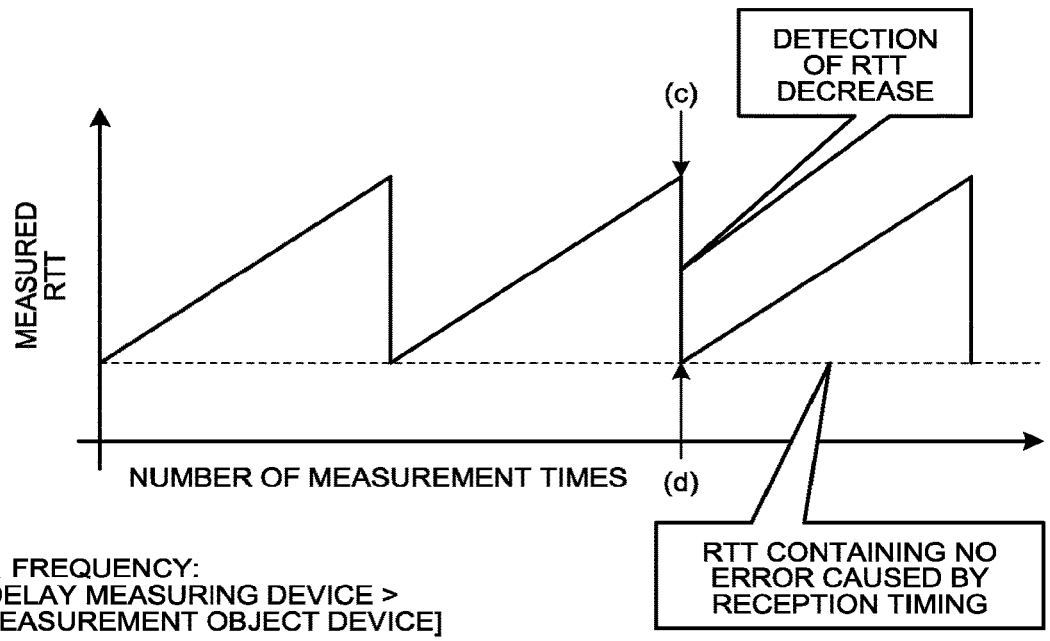
FIG. 6 is a chart illustrating a change of an RTT value measured by the RTT measuring unit, whose behavior is reverse to that in FIG. 5.
FIG. 7 is a table illustrating a relationship among a frequency deviation, a measurement period and an RTT measurement resolution.

FIG. 6 is a chart illustrating a change in RTT values measured by the RTT measuring unit 17, whose behavior is reverse to that in FIG. 5. Inversely with FIG. 5, FIG. 6 illustrates a change of RTT values in a case where the OTU2 frame frequency satisfies "delay measuring device 1>measurement object device 3", i.e., a case where the delay measuring device 1 has an OTU2 frame transmission frequency higher than the object device 3. Here, as with the case in FIG. 5, the number of measurement times may be replaced with elapsed time.

In the delay measuring device 1, when the RTT measuring unit 17 measures the RTT a number of times, RTT values repeat continuous increase and subsequent decrease in the RTT value, as illustrated in FIG. 6, such that the decrease appears with an approximate time corresponding to a frame length of the OTU2 frame. The decrease that appears with an approximate time corresponding to the frame length is an error caused by the reception timing of DM bits in the measurement object device 3. Accordingly, in the delay measuring device 1, when the RTT change detection unit 18 detects the RTT value decrease, i.e., when it detects the decrease in a case where RTT values repeat a change of the continuous increase and the subsequent decrease, the RTT determination unit 19 determines that an RTT value at the timing of detection of the RTT value decrease by the RTT change detection unit 18 is the smallest value, i.e., an RTT value containing the least amount of error.

Similarly to the case illustrated in FIG. 5, the RTT change detection unit 18 may be configured not only to detect a change of RTT values, but also to perform detection in the form of a change amount. In FIG. 6, when the measured RTT changes from (c) to (d), the RTT change detection unit 18 detects an RTT decrease that appears with an approximate time corresponding to the frame length. The RTT determination unit 19 determines that the RTT measured at (d) is an RTT including the least amount of error.

Here, the RTT change detection unit 18 may detect, a number of times, the RTT decrease that appears with an approximate time corresponding to the frame length, and the RTT determination unit 19 may regard the smallest RTT, among the RTT measurement results corresponding to (d) of the number of times, as an RTT including the least amount of error. Further, when the RTT measurement is performed a number of times over one or more measurement periods, the RTT determination unit 19 may regard the smallest RTT among the RTT measurement results as an RTT including the least amount of error.

A difference in frame transmission frequency between the delay measuring device 1 and the measurement object device 3, i.e., variations in the measurement period and RTT measurement resolution caused by the frequency deviation are illustrated in FIG. 7. FIG. 7 is a table representing relations among the frequency deviation, the measurement period and the RTT measurement resolution. Here, as an example, an explanation will be given for the case of 10G.

For example, when an OTU2 frame is transmitted, when the frequency deviation between the delay measuring device 1 and the measurement object device 3 is 10 ppm, there is generated a misalignment of 122 ps per one frame, because the frame length of the OTU2 frame is 12.2 μs. Due to this misalignment, the RTT measured in the delay measuring device 1 repeats decrease or increase with a period appearing once per "12.2 μs÷122 ps=100,000" frames. Further, since the frame length of one frame is 12.2 μs, when it is converted into time, 100,000×12.2 μs=1,220 ms results in the measurement period. The RTT measurement resolution at this time depends on the frequency deviation, and comes to be ±122 ps that is the degree of the misalignment described above, and corresponds to the size of 2 bits illustrated in FIG. 5. From this point of view, the delay measuring device 1 can assure that the measurement resolution is not more than the time corresponding to the frame length.

Further, when OTU2 frames are transmitted, when the frequency deviation between the delay measuring device 1 and the measurement object device 3 is 40 ppm, there is generated a misalignment of 488 ps per one frame, because the frame length of the OTU2 frame is 12.2 μs. Due to this misalignment, the RTT measured in the delay measuring device 1 repeats decrease or increase with a period appearing once per "12.2 µs÷488 ps=25,000 frames." Further, since the frame length of one frame is 12.2 µs, when it is converted into time, 25,000×12.2 µs=305 ms results in the measurement period. The RTT measurement resolution at this time depends on the frequency deviation, and comes to be ±488 ps that is the degree of the misalignment described above, and corresponds to the size of 2 bits illustrated in FIG. 5. From this point of view, the delay measuring device 1 can assure that the measurement resolution is not more than the time corresponding to the frame length.

Figure 8:
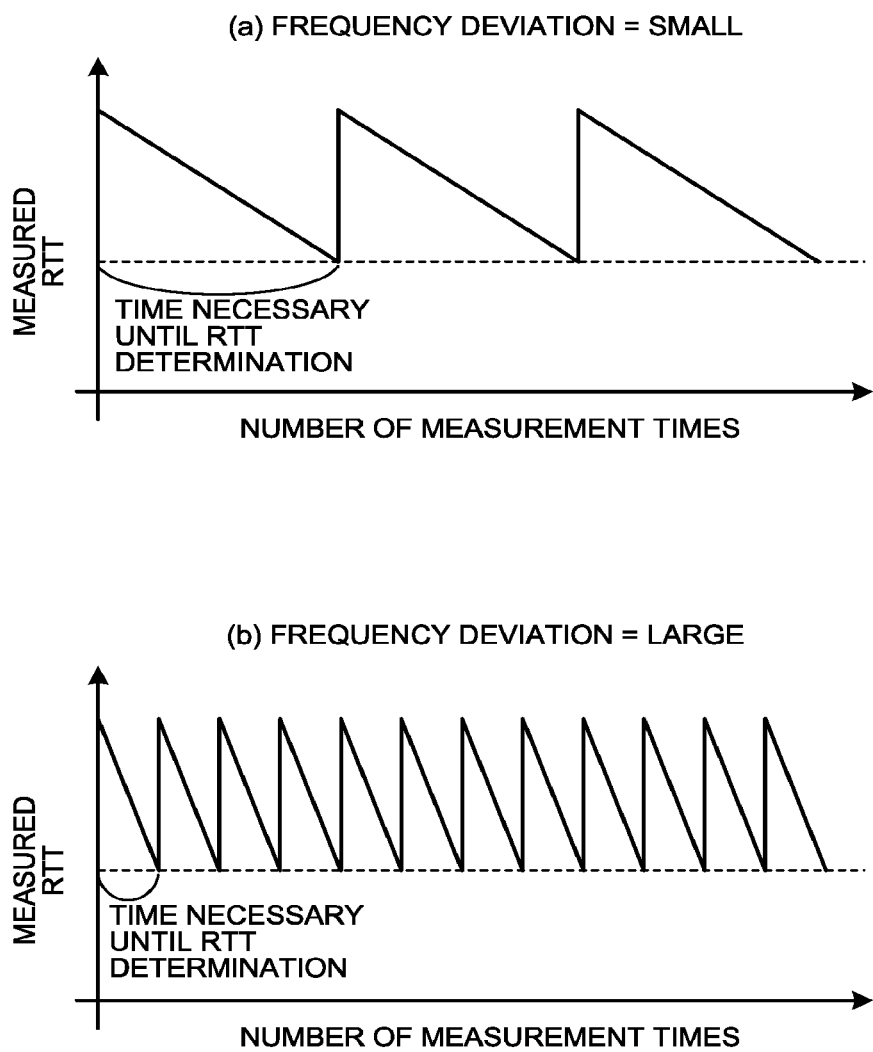
FIG. 8 is a chart illustrating a relationship between a frequency deviation and the number of measurement times.

FIG. 8 is a chart illustrating the relationship between the frequency deviation and the number of measurement times. (a) illustrates a case where the frequency deviation is small, and (b) illustrates a case where the frequency deviation is large. Here, as with the case in FIGS. 5 and 6, the number of measurement times may be replaced with elapsed time. For example, in the example illustrated in FIG. 7, when a frequency deviation is changed from the smaller frequency deviation of 10 ppm to the larger frequency deviation of 40 ppm that is four times the former, the measured RTT values make a change from a period of 1,220 ms to a period of 305 ms and repeat decrease or increase, and so the time necessary for making RTT determination, i.e., the measurement period, can be ¼. On the other hand, the RTT measurement resolution is reduced from ±122 ps to ±488 ps. Thus, the measurement period and the RTT measurement resolution have a trade-off relationship.

As described above, according to this embodiment, when a CPRI signal is encapsulated and transferred in a frame having a known frame length, the delay measuring device 1 performs RTT measurement with respect to the measurement object device 3 a number of times. When the RTT values measured a number of times continuously decrease and then increase, the timing before the increase is chosen, or when the RTT values continuously increase and then decrease, the timing of the decrease is chosen. Then, the RTT value at thus chosen timing is set as an RTT value containing the least amount of error. Consequently, it becomes possible to measure the RTT in units each length of which is smaller than the frame length.

Further, when the RTT measurement is performed over one or more measurement periods with respect to the RTT change, the delay measuring device 1 can set the smallest value of a plurality of RTT values as an RTT value including the least amount of error.

Second Embodiment

In the first embodiment, RTT measurement can be performed with a finer particle size, as compared with the conventional RTT measurement using DM bits. In this embodiment, an explanation will be given for operations in a case where a frequency deviation between the devices is large and the RTT measurement resolution does not reach a desired particle size, the delay measuring device or measurement object device changes the OTU2 frame transmission frequency.

Figure 9:
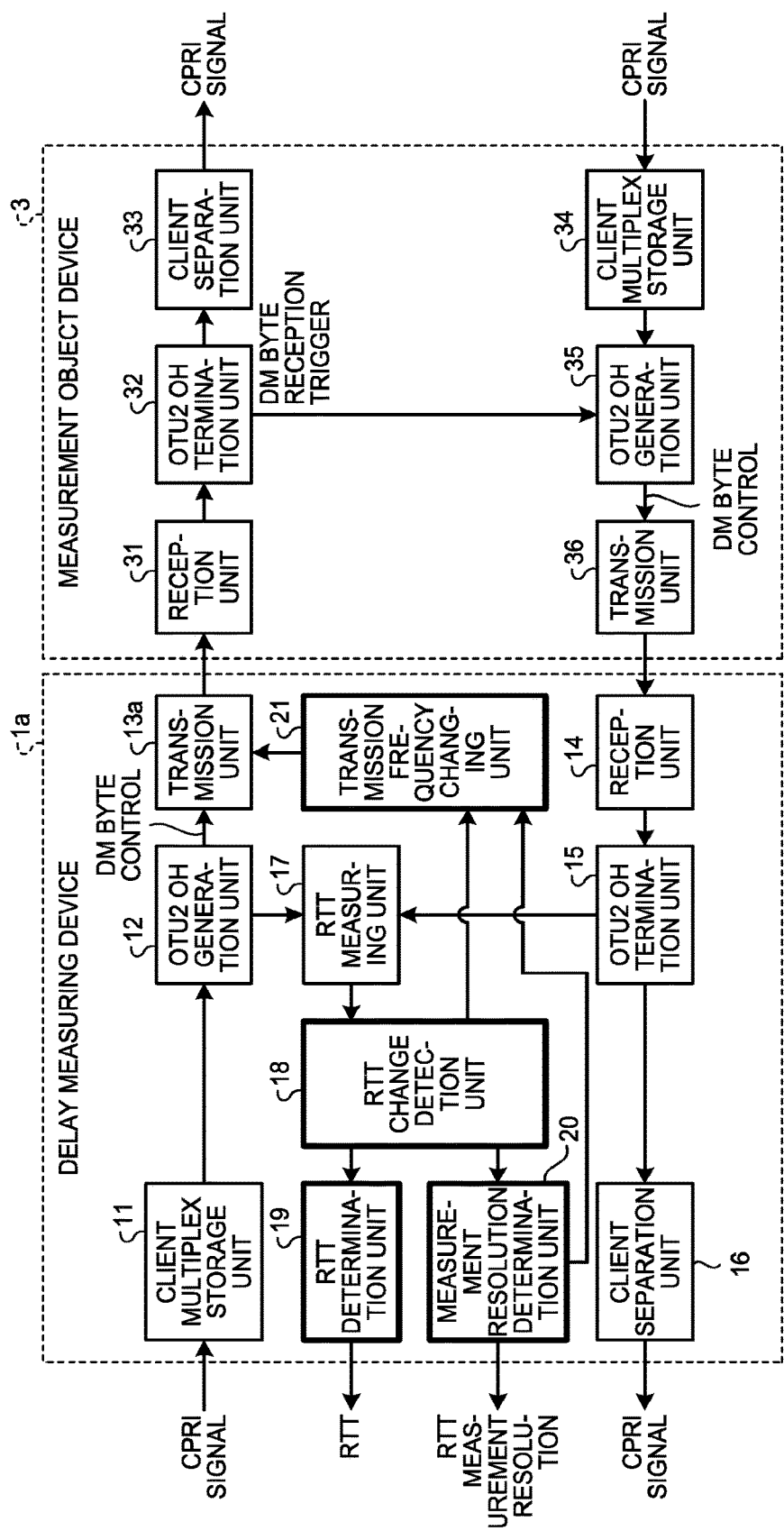
FIG. 9 is a diagram illustrating a configuration example of a communication system according to a second embodiment.

FIG. 9 is a diagram illustrating a configuration example of a communication system according to this embodiment. The communication system is composed of: a delay measuring device 1a that is a communication device for measuring the RTT; and a measurement object device 3 that is a communication device serving as an object for measuring the RTT using the delay measuring device 1a and is configured to transmit a return frame in response to a frame received from the delay measuring device 1a.

The delay measuring device 1a differs from the delay measuring device 1 in that a transmission frequency changing unit 21 is added thereto, and a transmission unit 13a is provided in place of the transmission unit 13. The transmission frequency changing unit 21 serves as transmission frequency changing means configured to perform control to change a transmission frequency of the OTU2 frame to be transmitted by the transmission unit 13, when it is desired that the measurement particle size is made finer, based on a frequency deviation obtained by estimation of the magnitude relationship in transmission frequency between the delay measuring device 1a and the measurement object device 3 in the RTT change detection unit 18, and the current RTT measurement resolution obtained in the measurement resolution determination unit 20, so that the frequency deviation at the RTT change detection unit 18 is a frequency deviation for obtaining a desired RTT measurement resolution. The transmission unit 13a serves as transmission means configured to change the OTU2 frame transmission frequency, under the control of the transmission frequency changing unit 21.

Figure 10:
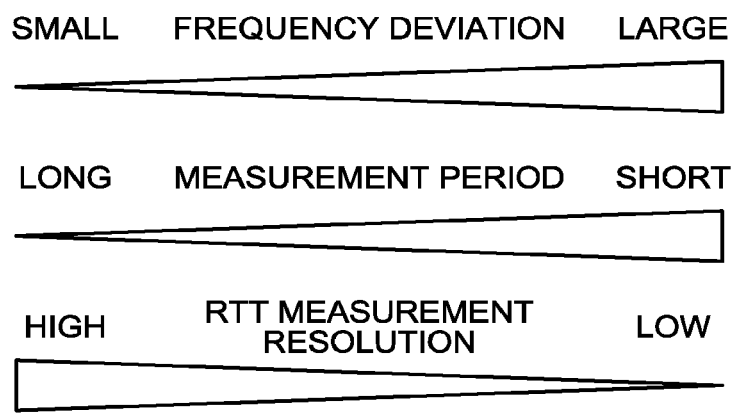
FIG. 10 is an illustration showing a relationship among respective changes of a frequency deviation, a measurement period and an RTT measurement resolution.

FIG. 10 is an illustration showing the relationship among changes of the frequency deviation, the measurement period and the RTT measurement resolution. As the frequency deviation is larger, the measurement period becomes shorter, but the RTT measurement resolution becomes lower. As the frequency deviation is smaller, the measurement period becomes longer, but the RTT measurement resolution becomes higher. Since the frequency deviation, the measurement period and the RTT measurement resolution have this relationship illustrated in FIG. 10, when the RTT measurement resolution does not reach a desired particle size, the transmission frequency changing unit 21 performs control for changing the transmission frequency of its own device to make the frequency deviation smaller. When the measurement period also suffers some restriction, the transmission frequency changing unit 21 performs control for changing the transmission frequency of its own device to make the frequency deviation smaller, based on the relationship between the RTT measurement resolution and the measurement period.

Here, the function of changing the transmission frequency may be disposed on the measurement object device 3 side in place of the delay measuring device 1a. Also in this case, the same effect can be realized.

Figure 11:
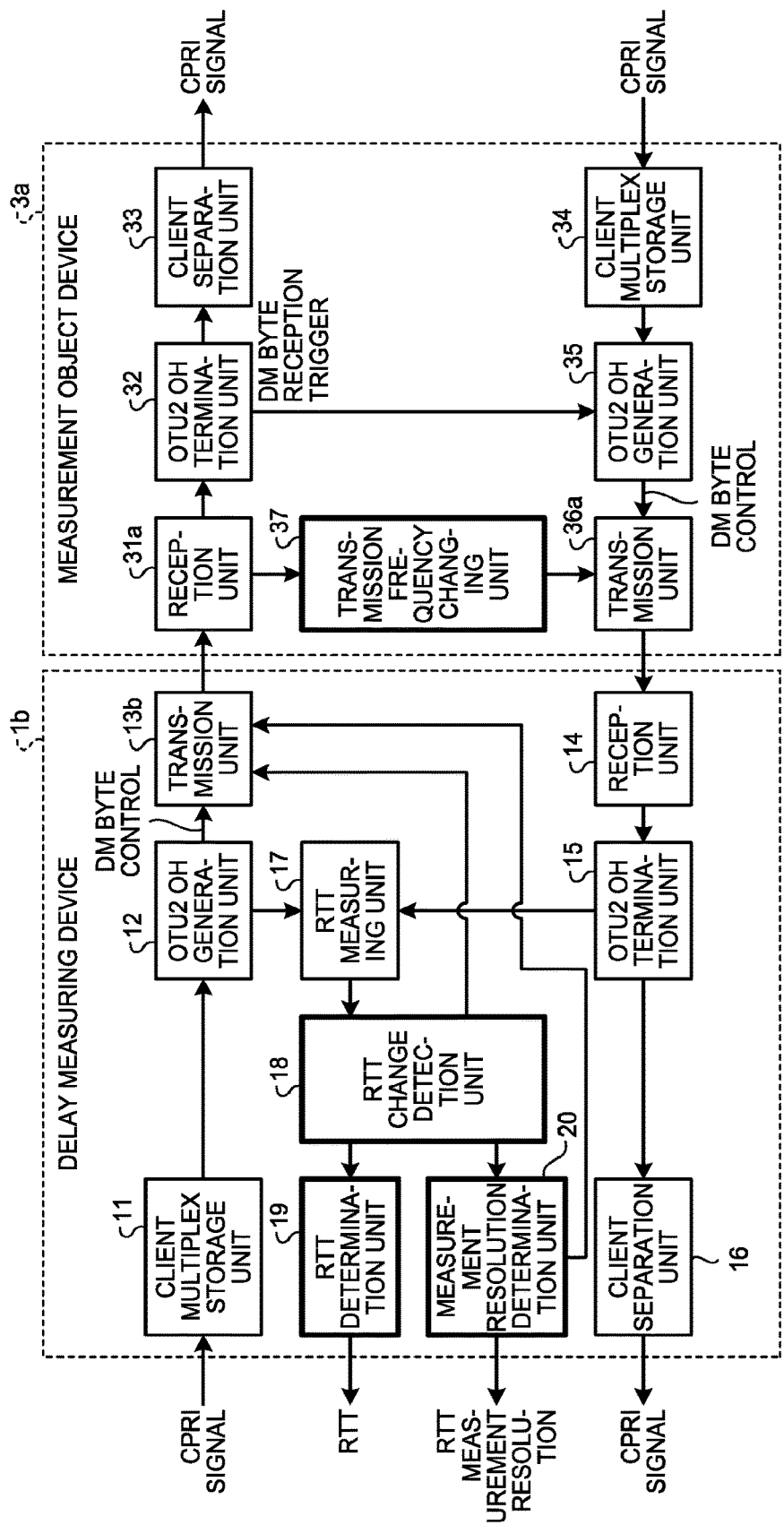
FIG. 11 is a diagram illustrating a configuration example of a communication system according to the second embodiment, in a case where a measurement object device changes a transmission frequency.

FIG. 11 is a diagram illustrating a configuration example of a communication system according to this embodiment, in a case where a measurement object device changes the transmission frequency. The communication system is composed of: a delay measuring device 1b that is a communication device for measuring the RTT; and a measurement object device 3a that is a communication device serving as an object for measuring the RTT by the delay measuring device 1b and is configured to transmit a return frame in response to a frame received from the delay measuring device 1b.

The delay measuring device 1b differs from the delay measuring device 1 in that a transmission unit 13b is provided in place of the transmission unit 13. The transmission unit 13b serves as transmission means configured to transmit an instruction for changing the transmission frequency to the measurement object device 3a, in accordance with instructions from the RTT change detection unit 18 and the measurement resolution determination unit 20. For a method of transmitting the instruction for changing the transmission frequency, the instruction may be contained in the overhead region of an OTU2 frame, or another method may be used.

The measurement object device 3a differs from the measurement object device 3 in that a transmission frequency changing unit 37 is added thereto, and a reception unit 31a and a transmission unit 36a are provided in place of the reception unit 31 and the transmission unit 36, respectively. The transmission frequency changing unit 37 serves as transmission frequency changing means configured to perform control for changing the transmission frequency of OTU2 frames to be transmitted from the transmission unit 36a, in accordance with instructions from the RTT change detection unit 18 and the measurement resolution determination unit 20 of the delay measuring device 1b. The reception unit 31a serves as reception means that, when receiving the instructions from the RTT change detection unit 18 and the measurement resolution determination unit 20 of the delay measuring device 1b, outputs the received instruction to the transmission frequency changing unit 37. The transmission unit 36a serves as transmission means configured to change a transmission frequency of the OTU2 frame under the control of the transmission frequency changing unit 37.

In the case where the measurement object device 3a includes the function of changing the transmission frequency, it is necessary to transmit information about the frequency deviation in the RTT change detection unit 18 mounted on the delay measuring device 16 and the RTT measurement resolution in the measurement resolution determination unit 20 from the transmission unit 13b of the delay measuring device 1b to the measurement object device 3a. Further, since the measurement object device 3a changes the transmission frequency based on information received from the delay measuring device 1b, its sequence becomes complicated. Consequently, the function of changing the transmission frequency is preferably disposed on the delay measuring device 1a side.

As described above, according to this embodiment, the delay measuring device 1a or the measurement object device 3a changes the transmission frequency of a frame so that the frequency deviation between the devices can be changed. Consequently, the RTT measurement resolution can be made with a desired particle size.

Third Embodiment

In the RTT measurement, there may be such a case that the frequency deviation between the delay measuring device 1 and the measurement object device 3 cannot be detected because of, e.g., frequency synchronization, or that the frequency deviation is too small and the measuring time is prolonged in an unrealistic condition. In this situation, even if the RTT measurement is performed a number of times, the RTT fluctuation cannot be monitored. In this embodiment, an explanation will be given for operations in which the delay measuring device or the measurement object device shifts a frame phase of the OTU2 frame to be transmitted.

Figure 12:
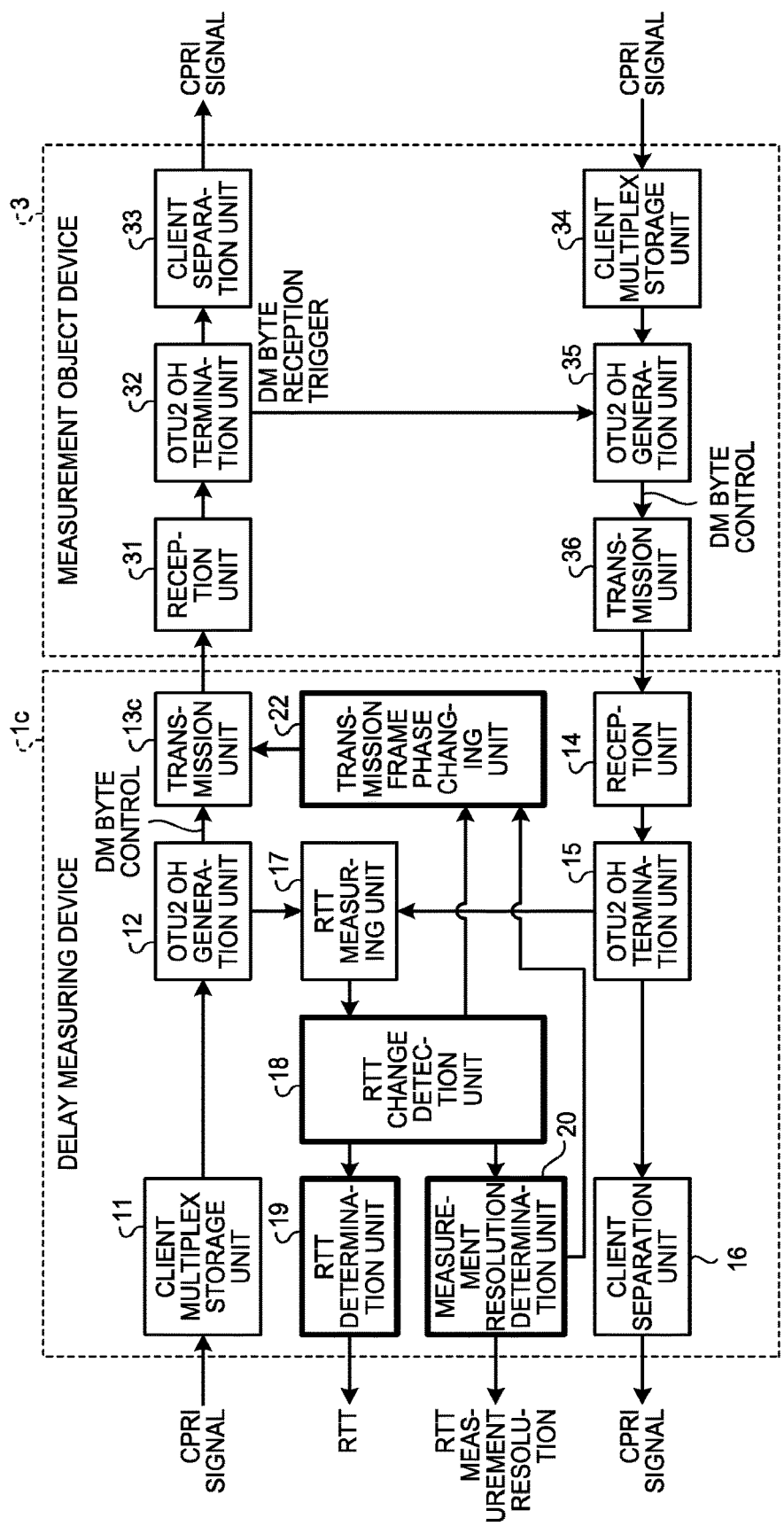
FIG. 12 is a diagram illustrating a configuration example of a communication system according to a third embodiment.

FIG. 12 is a diagram illustrating a configuration example of a communication system according to this embodiment. The communication system is composed of: a delay measuring device 1c that is a communication device for measuring the RTT; and a measurement object device 3 that is a communication device serving as an object for measuring the RTT by the delay measuring device 1c and is configured to transmit a return frame in response to a frame received from the delay measuring device 1c.

The delay measuring device 1c differs from the delay measuring device 1 in that a transmission frame phase changing unit 22 is added thereto, and a transmission unit 13c is provided in place of the transmission unit 13. The transmission frame phase changing unit 22 serves as transmission frame phase changing means configured to perform control for shifting the frame phase by inserting an empty bit or empty bits between OTU2 frames to be transmitted from the transmission unit 13c, in accordance with the instructions from the RTT change detection unit 18 and the measurement resolution determination unit 20. The transmission unit 13c serves as transmission means configured to shift the frame phase by inserting an empty bit or empty bits between the OTU2 frames, under the control of the transmission frame phase changing unit 22.

Figure 13:
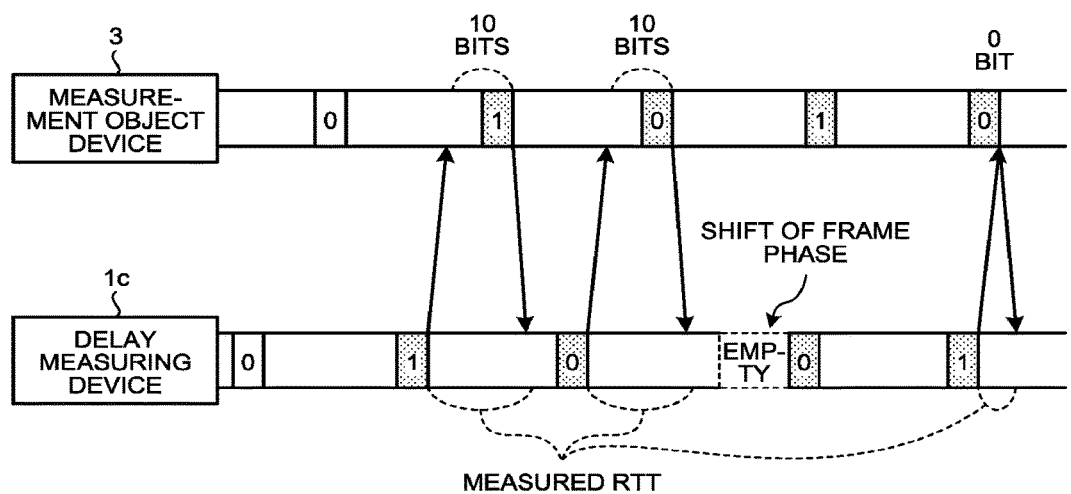
FIG. 13 is a chart illustrating a state of a delay measuring device measuring an RTT with respect to a measurement object device.

FIG. 13 is a chart illustrating a state of the delay measuring device 1c measuring the RTT with respect to the measurement object device 3. In the delay measuring device 1c, the RTT change detection unit 18 cannot detect the frequency deviation with respect to the measurement object device 3, because a misalignment in transmission timing of the DM bit in the measurement object device 3 is 10 bits keeping unchanged. Further, since the RTT change detection unit 18 cannot detect the frequency deviation, the measurement resolution determination unit 20 also cannot determine the RTT measurement resolution. In this case, the RTT change detection unit 18 and the measurement resolution determination unit 20 instruct the transmission frame phase changing unit 22 to change a phase of the transmission frame. The transmission frame phase changing unit 22 performs control for shifting the frame phase to the transmission unit 13c by inserting an empty bit or empty bits between the OTU2 frames to be transmitted, in accordance with the instruction from the RTT change detection unit 18 and the measurement resolution determination unit 20.

FIG. 13 represents that the number of times of inserting an empty bit or empty bits in the OTU2 frames is only once. However, the single-time insertion causes the frequency deviation to be changed between before and after the insertion, but allows again the frequency deviation not to be detected in the RTT measurement after the insertion. For this reason, the transmission frame phase changing unit 22 of the delay measuring device 1c performs control for making insertion a number of times while changing the empty bit size. The RTT measuring unit 17 measures the RTT for each of the different empty bit sizes. The RTT change detection unit 18 calculates the frequency deviation for each of the different empty bit sizes, and the measurement resolution determination unit 20 determines the RTT measurement resolution from the frequency deviation calculated by the RTT change detection unit 18.

Here, the function of shifting the frame phase may be disposed on the measurement object device 3 side in place of the delay measuring device 1c. Also in this case, the same effect can be realized.

Figure 14:
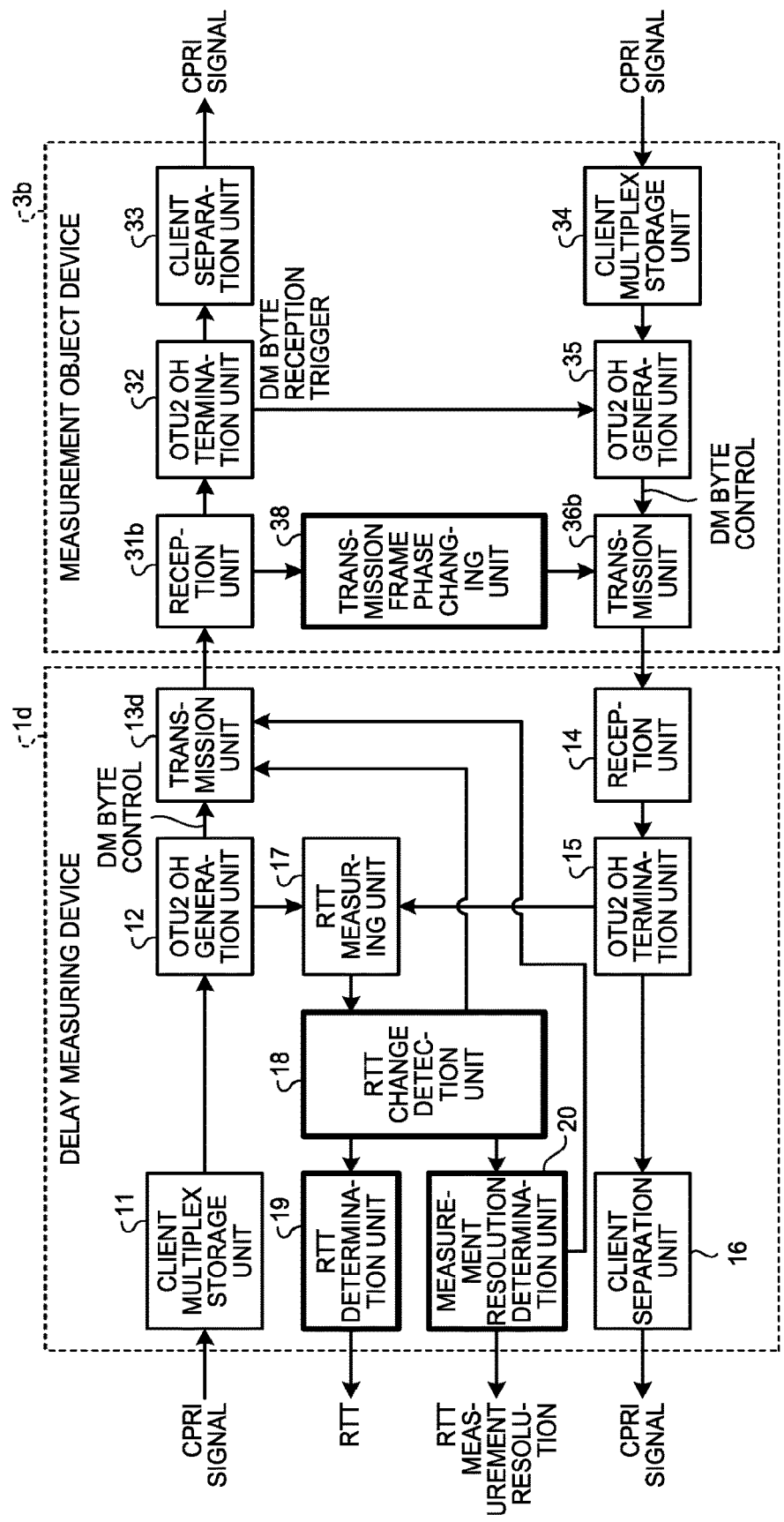
FIG. 14 is a diagram illustrating a configuration example of a communication system according to the third embodiment, in a case where a measurement object device shifts a frame phase.

FIG. 14 is a chart illustrating a configuration example of a communication system according to this embodiment, in a case where a measurement object device shifts the frame phase. The communication system is composed of: a delay measuring device 1d that is a communication device for measuring the RTT; and a measurement object device 3b that is a communication device serving as an object for measuring the RTT by the delay measuring device 1d and is configured to transmit a return frame in response to a frame received from the delay measuring device 1d.

The delay measuring device 1d differs from the delay measuring device 1 in that a transmission unit 13d is provided in place of the transmission unit 13. The transmission unit 13d serves as transmission means configured to transmit an instruction for changing the transmission frame phase to the measurement object device 3b, in accordance with instructions from the RTT change detection unit 18 and the measurement resolution determination unit 20. For a method of transmitting the instruction for changing the transmission frame phase, the instruction may be contained in the overhead region of an OTU2 frame, or another method may be used.

The measurement object device 3b differs from the measurement object device 3 in that a transmission frame phase changing unit 38 is added thereto, and a reception unit 31b and a transmission unit 36b are provided in place of the reception unit 31 and the transmission unit 36, respectively. The transmission frame phase changing unit 38 serves as transmission frame phase changing means configured to perform control for shifting the frame phase by inserting an empty bit or empty bits between the OTU2 frames to be transmitted from the transmission unit 36b, in accordance with the instruction from the RTT change detection unit 18 and the measurement resolution determination unit 20 of the delay measuring device 1d. The reception unit 31b serves as reception means that, when receiving the instruction from the RTT change detection unit 18 and the measurement resolution determination unit 20 of the delay measuring device 1d, outputs the received instruction to the transmission frame phase changing unit 38. The transmission unit 36b serves as transmission means configured to shift the frame phase by inserting an empty bit or empty bits between the OTU2 frames, under the control of the transmission frame phase changing unit 38.

Figure 15:
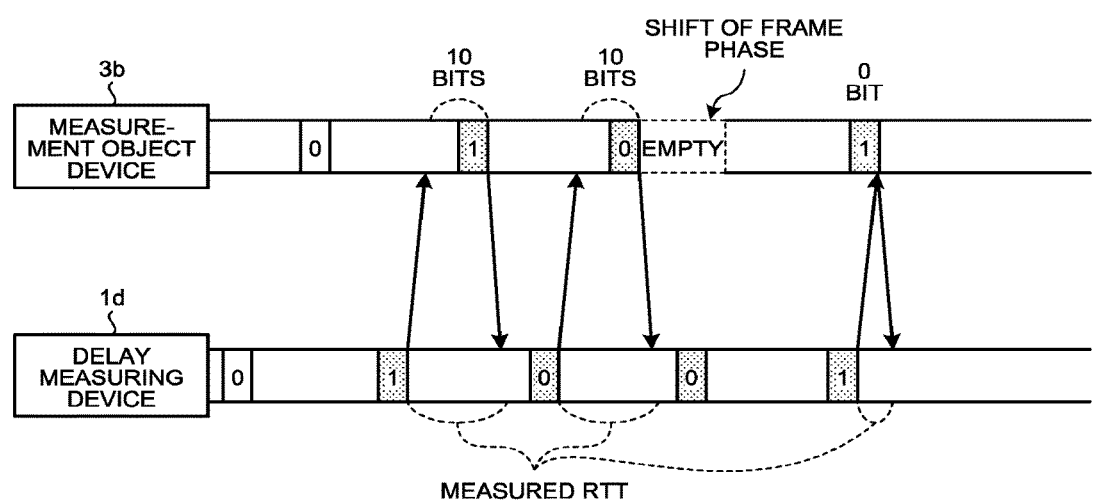
FIG. 15 is a chart illustrating a state of a delay measuring device measuring an RTT with respect to a measurement object device.

FIG. 15 is a chart illustrating a state of the delay measuring device 1d measuring the RTT with respect to the measurement object device 3b. In the delay measuring device 1d, the RTT change detection unit 18 cannot detect the frequency deviation with respect to the measurement object device 3b, because a misalignment in transmission timing of the DM bit in the measurement object device 3b is 10 bits keeping unchanged. Further, since the RTT change detection unit 18 cannot detect the frequency deviation, the measurement resolution determination unit 20 also cannot determine the RTT measurement resolution. In this case, the RTT change detection unit 18 and the measurement resolution determination unit 20 instruct the transmission unit 13d to change a phase of the transmission frame. The transmission unit 13d transmits the instruction for changing the transmission frame phase to the measurement object device 3b. In the measurement object device 3b, when the transmission frame phase changing unit 38 receives the instruction for changing the transmission frame phase via the reception unit 31b, it performs control for shifting the frame phase to the transmission unit 36b by inserting an empty bit or empty bits between the OTU2 frames to be transmitted.

Here, unlike the above-described case where the delay measuring device 1c is used to shift the frame phase by inserting an empty bit or empty bits between the OTU2 frames to be transmitted, the measurement object device 3b can grasp the degree of a phase difference between the timing of receiving the DM bits from the delay measuring device 1d and the timing of transmitting the DM bits from its own device, namely 10 bits in this example. In this case, the measurement object device 3b merely needs that the transmission frame phase changing unit 38 adjusts the frame phase to remove the phase difference, i.e., to transmit the DM bits from its own device immediately after reception of the DM bits. Specifically, the measurement object device 3b only has to make insertion of empty bits having a size of 10 bits. In this way, in the case where the measurement object device 3b changes the frame phase, the delay measuring device 1d does not need to perform the RTT measurement a number of times.

Here, in either case of shifting the frame phase by the delay measuring device 1c or the measurement object device 3b, shifting the frame phase has a possibility to cause affection on the stored signal such as signal interruption. For this reason, the shifting is preferably performed in a start-up period.

As described above, according to this embodiment, if the frequency deviation cannot be detected, or if the measuring time is prolonged so much, the delay measuring device 1c is adapted to change the transmission frame phase. By doing so, in the delay measuring device 1c, the frequency deviation between the devices can be detected, and thereby RTT measurement can be performed. Further, by the measurement object device 3b that is the measurement object changing the transmission frame phase, the number of RTT measurement times in the delay measuring device 1d can be reduced.

Fourth Embodiment

In this embodiment, an explanation will be given for a method of reducing a noise component from measured RTT values, when the frequency deviation of frame transmission frequencies between a delay measuring device and a measurement object device contains the noise component such as a jitter.

Figure 16:
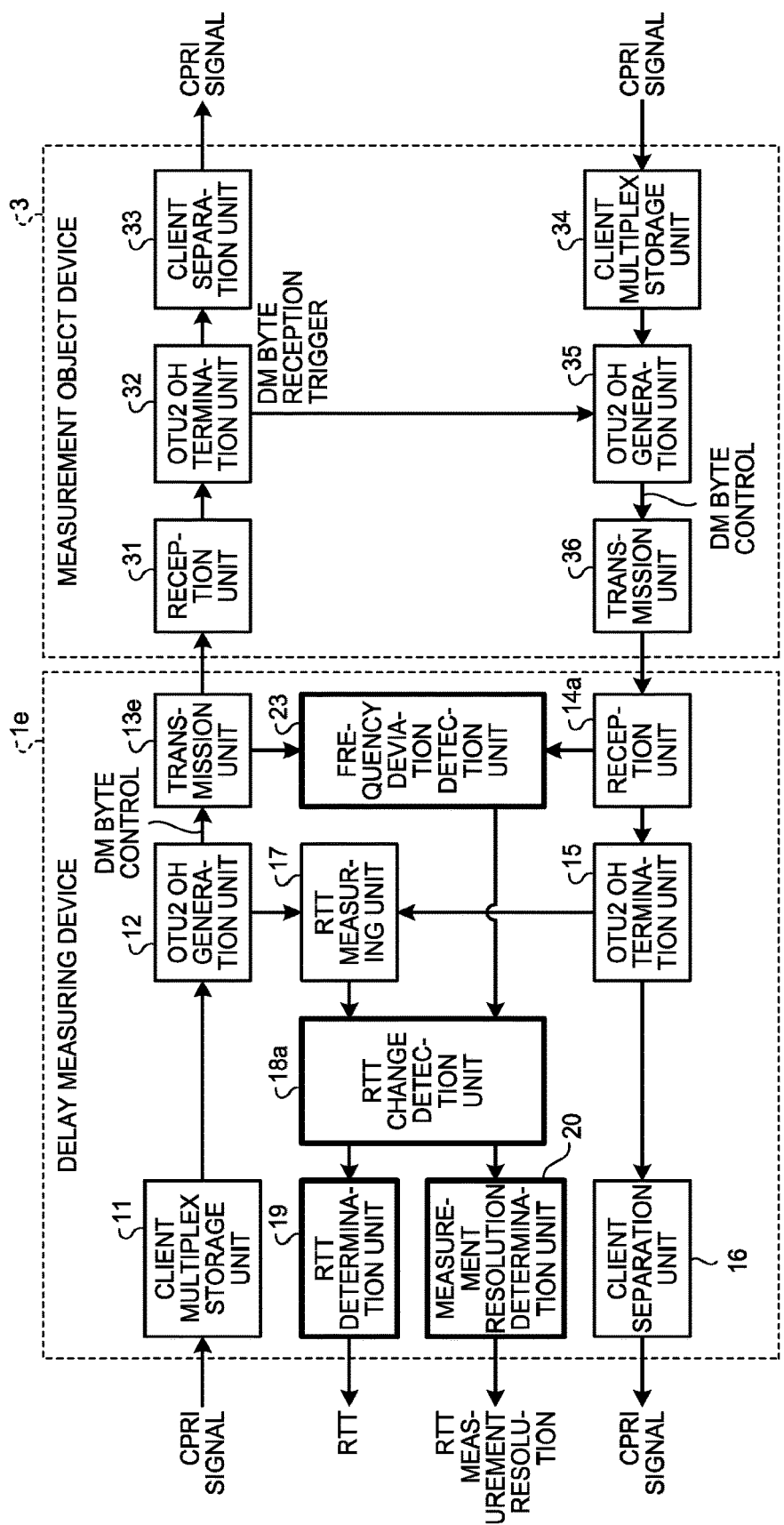
FIG. 16 is a diagram illustrating a configuration example of a communication system according to a fourth embodiment.

FIG. 16 is a diagram illustrating a configuration example of a communication system according to a fourth embodiment. The communication system according to the fourth embodiment is composed of a delay measuring device 1e and a measurement object device 3. The delay measuring device 1e differs from the delay measuring device 1 according to the first embodiment in that a transmission unit 13e, a reception unit 14a and an RTT change detection unit 18a are provided in place of the transmission unit 13, the reception unit 14 and the RTT change detection unit 18, respectively, and a frequency deviation detection unit 23 is added thereto.

The transmission unit 13e serves as transmission means configured to give notice of transmission clock information to the frequency deviation detection unit 23. The transmission clock information is information about the frequency of a clock used in the delay measuring device 1e.

The reception unit 14a serves as reception means configured to give notice of reception clock information to the frequency deviation detection unit 23. The reception clock information is information about the frequency of a clock used in the measurement object device 3. For example, the reception unit 14a acquires reception clock information, based on reception clock information contained in the OTU2 frames received from the measurement object device 3, or the notice of reception clock information from the measurement object device 3. The above-described methods of acquiring reception clock information by the reception unit 14a from the measurement object device 3 are commonly used, but the invention is not limited to these methods.

The frequency deviation detection unit 23 serves as frequency deviation detection means configured to: acquire transmission clock information from the transmission unit 13e; acquire reception clock information from the reception unit 14a; and detect the frequency deviation of frame transmission frequencies between its own device and the measurement object device 3 by use of the transmission clock information and the reception clock information thus obtained. The frequency deviation in frame transmission frequency between its own device and the measurement object device 3 is a delay time fluctuation representing the fluctuation of a delay time that is the time taken until the delay measuring device 1e receives a responsive OTU2 frame from the measurement object device 3 after the delay measuring device 1e transmits an OTU2 frame to the measurement object device 3.

The RTT change detection unit 18a serves as round trip time change detection means configured to perform a digital filter signal processing by use of RTT values measured by the RTT measuring unit 17 and the frequency deviation detected by the frequency deviation detection unit 23, so as to perform a process for reducing a noise component from RTT values measured by the RTT measuring unit 17. For the process for reducing a noise component, the RTT change detection unit 18a removes or attenuates the noise component.

Next, an explanation will be given for operations in a case where, when the frequency deviation of frame transmission frequencies between the delay measuring device 1e and the measurement object device 3 contains a noise component, the noise component is reduced from RTT values in the delay measuring device 1e. In the following description, a jitter is exemplified specifically as the noise component, but the noise component contained in the frequency deviation is not limited to a jitter.

Figure 17:
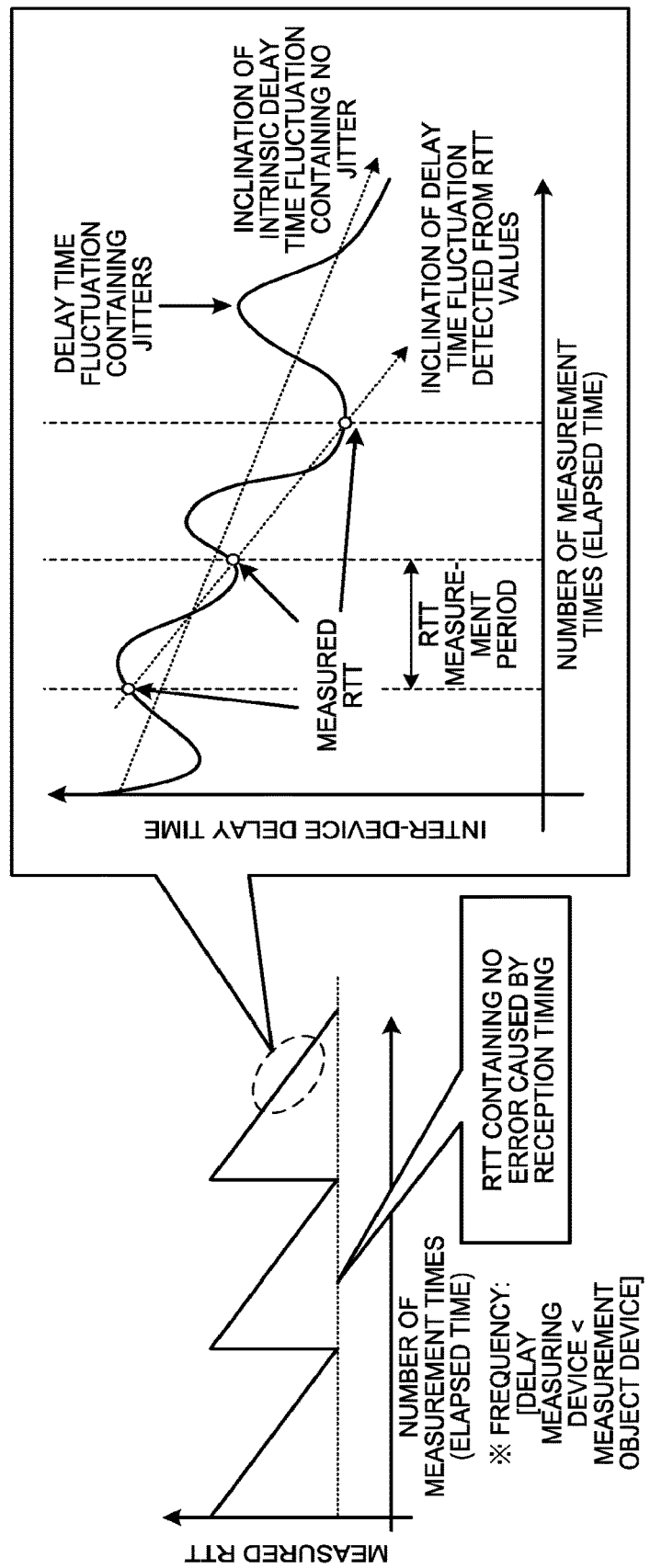
FIG. 17 is a chart illustrating a change of an RTT value measured by an RTT measuring unit, and a delay time fluctuation based on a frequency deviation detected by a frequency deviation detection unit, in a delay measuring device according to the fourth embodiment.

FIG. 17 is a chart illustrating a change of RTT values measured by the RTT measuring unit 17, and a delay time fluctuation based on the frequency deviation detected by the frequency deviation detection unit 23, in the delay measuring device 1e according to the fourth embodiment. In FIG. 17, the left side chart illustrating the relationship between the number of measurement times and the measured RTT is the same as the left side chart of FIG. 5 according to the first embodiment. As described previously, the number of measurement times may be replaced with elapsed time. In FIG. 17, the right side chart illustrates an image presented by enlarging a portion surrounded by a broken line circle on a decrease of RTT values in the left side chart of FIG. 17. The horizontal axis indicates the number of measurement times in the RTT measuring unit 17, i.e., the elapsed time, and the vertical axis indicates the delay time between the delay measuring device 1e and the measurement object device 3, i.e., the inter-device delay time. The inter-device delay time is supposed to include an RTT value.

In the left side chart of FIG. 17, the portion surrounded by the broken line circle looks as if RTT values exhibit a monotonic decrease. However, when the frequency deviation of frame transmission frequencies between the delay measuring device 1e and the measurement object device 3 contains jitters, the frequency deviation containing the jitters detected by the frequency deviation detection unit 23, i.e., a delay time represented by the delay time fluctuation containing the jitters, does not exhibit a monotonic decrease, but undergoes a transition in the decrease direction while repeating up and down fluctuation, as illustrated in the right side chart of FIG. 17. In the right side chart of FIG. 17, three white dots denote the RTT measured by the RTTs measuring unit 17 at intervals each equal to the RTT measurement period. Regardless of whether the frequency deviation of frame transmission frequencies between the delay measuring device 1e and the measurement object device 3 contains jitters, when the frequency deviation detection unit 23 and the RTT measuring unit 17 operate normally, the three white dots denoting the RTTs measured by the RTT measuring unit 17 appear on the delay time fluctuation that is the frequency deviation detected by the frequency deviation detection unit 23, e.g., on the delay time fluctuation containing jitters in the right side chart of FIG. 17.

In the right side chart of FIG. 17, a broken line passing through the three white dots denotes the inclination of the delay time fluctuation detected from the RTT measured by the RTT measuring unit 17, i.e., a change of the RTT values detected by the RTT change detection unit 18a. Further, in the right side chart of FIG. 17, a broken line not passing through the three white dots but passing through the delay time fluctuation containing the jitters denotes an inclination of an intrinsic delay time fluctuation containing no jitter. The intrinsic delay time fluctuation containing no jitter is a delay time fluctuation in a case where the frequency deviation detected by the frequency deviation detection unit 23 contains no noise component. Further, the intrinsic delay time fluctuation containing no jitter corresponds to a change of RTT values detected by the RTT change detection unit 18a in a case where the RTT measured by the RTT measuring unit 17 contains no jitter.

When the RTT change detection unit 18a uses only the RTT detected by the RTT measuring unit 17, it detects a change of RTT values as the inclination of the delay time fluctuation detected from RTT values illustrated in the right side chart of FIG. 17. Further, in the RTT change detection unit 18a, since RTT values are affected by the jitters, the frequency deviation of frame transmission frequencies between the delay measuring device 1e and the measurement object device 3, calculated from the RTT values, comes to contain some error.

In such a case, in order to reduce the influence of the jitters, it may be possible to cause the RTT change detection unit 18a to perform a signal processing on RTT values measured by the RTT measuring unit 17 using a digital filter or the like. However, for jitter components contained in the frequency deviation, the digital filter signal processing can detect only a frequency component lower than $f_S/2$ relative to the measuring frequency $f_S$, as defined by the sampling theorem. When the frequency deviation contains a jitter component caused by a frequency component higher than $f_S/2$ relative to the measuring frequency $f_S$, the digital filter signal processing cannot reduce the jitter component, and so aliasing is generated and can cause an error. As illustrated in the right side chart of FIG. 17, when RTT values measured by the RTT measuring unit 17 are affected by jitters, and the RTT measurement period of the RTT measuring unit 17 is not sufficiently short relative to the jitter component, if the RTT is measured at timings corresponding to top portions and bottom portions of the delay time fluctuation containing jitters, then a difference appears between the inclination of a change of RTT values, i.e., the delay time fluctuation detected from the RTT values, and the inclination of the intrinsic delay time fluctuation containing no jitter. When there is a difference between the inclinations of the delay time fluctuations, the RTT measurement resolution determined by the measurement resolution determination unit 20 comes to contain some error.

Therefore, according to this embodiment, the frequency deviation detection unit 23 acquires transmission clock information from the transmission unit 13e, acquires reception clock information from the reception unit 14a, and compares the acquired transmission clock frequency and reception clock frequency, thereby to detect the frequency deviation of frame transmission frequencies between the delay measuring device 1e and the measurement object device 3. The frequency deviation detection unit 23 can detect the frequency deviation with a shorter period than the RTT measurement period of the RTT measuring unit 17. Further, the frequency deviation detection unit 23 can detect the frequency deviation of a higher frequency component than that of the RTT measurement period of the RTT measuring unit 17. In the RTT change detection unit 18a, the frequency deviation detected by the frequency deviation detection unit 23 is used in the digital filter signal processing, and thereby it can reduce a jitter component of a higher frequency component, as compared with a case where the RTT measurement period in the RTT measuring unit 17 is used to perform the digital filter signal processing.

Figure 18:
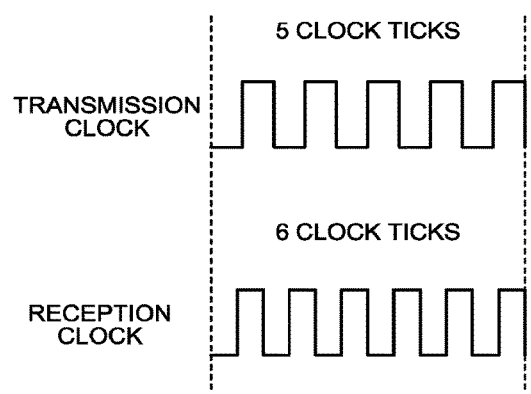
FIG. 18 is a chart illustrating an example of a transmission clock and a reception clock detected by the frequency deviation detection unit of the delay measuring device according to the fourth embodiment.

Next, a specific explanation will be given for a method of detecting the frequency deviation in the frequency deviation detection unit 23. FIG. 18 is a chart illustrating an example of the transmission clock and reception clock detected by the frequency deviation detection unit 23 of the delay measuring device 1e according to the fourth embodiment. FIG. 18 illustrates an example where the frequency deviation detection unit 23 detects how many clock ticks of the reception clock are counted within a unit time while using the transmission clock as a reference, and performs conversion to the frequency deviation by use of the number of clock ticks of the transmission clock within the unit time and the counted number of clock ticks of the reception clock within the unit time. Specifically, in the example illustrated in FIG. 18, since 6 clock ticks of the reception clock are counted while 5 clock ticks of the transmission clock are counted, the frequency deviation detection unit 23 can detect a frequency deviation corresponding to 1 clock tick. Here, the unit time is arbitrarily defined based on what the number of clock ticks is, but if the unit time is too small with respect to the frequency deviation, the number of clock ticks to be counted may become difficult to vary, thereby to lead to ineffectiveness. Therefore, the number of clock ticks is set for the unit time in consideration of the frequency deviation. In addition, the frequency deviation detection unit 23 may set a clock used as a reference clock for the unit time to the reception clock.

Figure 19:
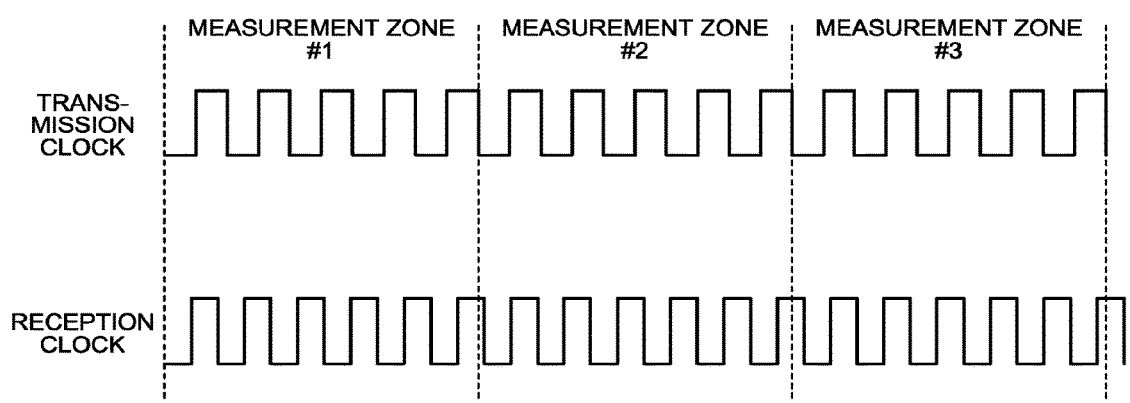
FIG. 19 is a view illustrating another example of a transmission clock and a reception clock detected by the frequency deviation detection unit of the delay measuring device according to the fourth embodiment.

FIG. 19 is a chart illustrating another example of the transmission clock and reception clock detected by the frequency deviation detection unit 23 of the delay measuring device 1e according to the fourth embodiment. In the case where the transmission clock and the reception clock are counted in the frequency deviation detection unit 23, it is preferable that the transmission clock ticks and the reception clock ticks entirely fall within a unit time or measurement zone, e.g., such that the reception clock ticks are 6/5 times the transmission clock ticks illustrated in FIG. 18. However, as illustrated in FIG. 19, the timing of the end of a measurement zone, i.e., the timing obtained by multiplying the transmission clock period by "n" cannot necessarily correspond to the timing obtained by multiplying the reception clock period by "m". Here, "n" and "m" are integers, which may be the same value or different values.

Further, as illustrated in the measurement zone #2 of FIG. 19, at the timing of the start of a measurement zone, the transmission clock and the reception clock are not necessarily in the same phase. In the frequency deviation detection unit 23, if counting of the transmission clock and the reception clock is intermittently performed in detecting the frequency deviation, i.e., if measurement zones are set with a gap intervening therebetween unlike FIG. 19, the frequency deviation to be detected may contain a larger amount of error because of influences such as phase mismatch between the transmission clock and the reception clock at the time of measurement start. For this reason, as illustrated in FIG. 19, in the frequency deviation detection unit 23, measurement zones are preferably set in a seamless manner. In the frequency deviation detection unit 23, when the measurement zones are set in a seamless manner, a phase-related error is inevitably contained in previous and next measurement zones, and so the influence of the error can be reduced by, e.g., taking an average of the frequency deviations detected in respective measurement zones. However, in the frequency deviation detection unit 23, when information including phase information can be obtained in respective measurement zones, the matter described above is not required, and the frequency deviation may be detected based on intermittent measurement zones.

In this embodiment, the RTT change detection unit 18a performs a digital filter signal processing by use of RTT values measured by the RTT measuring unit 17 and the frequency deviation detected by the frequency deviation detection unit 23, to perform a process for reducing jitters from RTT values measured by the RTT measuring unit 17. Specifically, the RTT change detection unit 18a performs the digital filter signal processing on a delay time fluctuation containing jitters that is the frequency deviation detected by the frequency deviation detection unit 23. As described previously, the RTT values detected by the RTT measuring unit 17 appear on a delay time fluctuation containing jitters. The RTT change detection unit 18a performs the digital filter signal processing on the delay time fluctuation containing jitters, and thereby obtains a delay time fluctuation containing the jitters treated by the digital filter signal processing. From the latter delay time fluctuation, the inter-device delay time, obtained at the timing when RTT values are measured by the RTT measuring unit 17, corresponds to an RTT value that has jitter reduced relative to an RTT value measured by the RTT measuring unit 17.

When all the jitters are ideally removed in the RTT change detection unit 18a, jitter-reduced RTT values come to appear on the inclination of the intrinsic delay time fluctuation containing no jitter illustrated in the right side chart of FIG. 17. In other words, when all the jitters are ideally removed in the RTT change detection unit 18a, a change of RTT values obtained from the jitter-reduced RTT values comes to have the inclination of the intrinsic delay time fluctuation containing no jitter illustrated in the right side chart of FIG. 17. Therefore, when all the jitters have been able to be ideally removed, the RTT change detection unit 18a can detect an RTT increase or the like, based on the inclination of the intrinsic delay time fluctuation containing no jitter, which has been obtained by the digital filter signal processing. However, when jitters cannot be completely removed, the RTT change detection unit 18a detects an RTT increase or the like, by use of RTT values obtained by the digital filter signal processing. The operations of the RTT change detection unit 18a thereafter are the same as those of the RTT change detection unit 18 according to the first embodiment.

Based on a change of the jitter-reduced RTT values, the RTT determination unit 19 determines an RTT value to be adopted, such that an RTT value obtained at the timing when the change of RTT values shows decrease to increase, i.e., at the time of (a) in FIG. 5, is an RTT value containing the least amount of error.

Further, based on the frequency deviation detected by the frequency deviation detection unit 23 and obtained via the RTT change detection unit 18a, the measurement resolution determination unit 20 determines the RTT measurement resolution of its own device.

It is noted that the present embodiment has been described about a case where the RTT values change with repetition of monotonic decrease and increase, i.e., the case illustrated in FIG. 5 according to first embodiment, as an example, but the gist described above may be applied to a case where the RTT values change with repetition of monotonic increase and decrease as illustrated in FIG. 6.

Further, this embodiment has been described based on the first embodiment, but this is a mere example, and the gist described above may be applied to the second and third embodiments. For example, when it is applied to the second embodiment, the RTT change detection unit 18a gives notice of information about the frequency deviation detected by the frequency deviation detection unit 23 to the transmission frequency changing unit 21, and the measurement resolution determination unit 20 gives notice of information about the RTT measurement resolution, which has been determined based on the frequency deviation detected by the frequency deviation detection unit 23, to the transmission frequency changing unit 21. The gist described above may be applied also to a case where the function of changing the transmission frequency is disposed in the measurement object device 3a.

Similarly, in the case where the gist described above is applied to the third embodiment, the RTT change detection unit 18a gives notice of information about the frequency deviation detected by the frequency deviation detection unit 23 to the transmission frame phase changing unit 22, and the measurement resolution determination unit 20 gives notice of information about the RTT measurement resolution, which has been determined based on the frequency deviation detected by the frequency deviation detection unit 23, to the transmission frame phase changing unit 22. The gist described above may be applied also to a case where the function of changing the transmission frame phase is disposed in the measurement object device 3b.

As described above, according to this embodiment, in the delay measuring device 1e, the frequency deviation detection unit 23 detects the frequency deviation using the transmission clock and the reception clock, with a rate higher than the case of the RTT measurement period of the RTT measuring unit 17. Then, the RTT change detection unit 18a performs a digital filter signal processing using the frequency deviation detected by the frequency deviation detection unit 23, thereby to reduce a noise component such as a jitter contained in the RTT values. By so doing, in the delay measuring device 1e, it is possible to reduce a higher frequency noise component, as compared with a case where the digital filter signal processing is performed based on the RTT measurement period of the RTT measuring unit 17.

Next, an explanation will be given for operations of the delay measuring device and the measurement object device according to the aforementioned embodiments, with reference to a flowchart.

Figure 20:
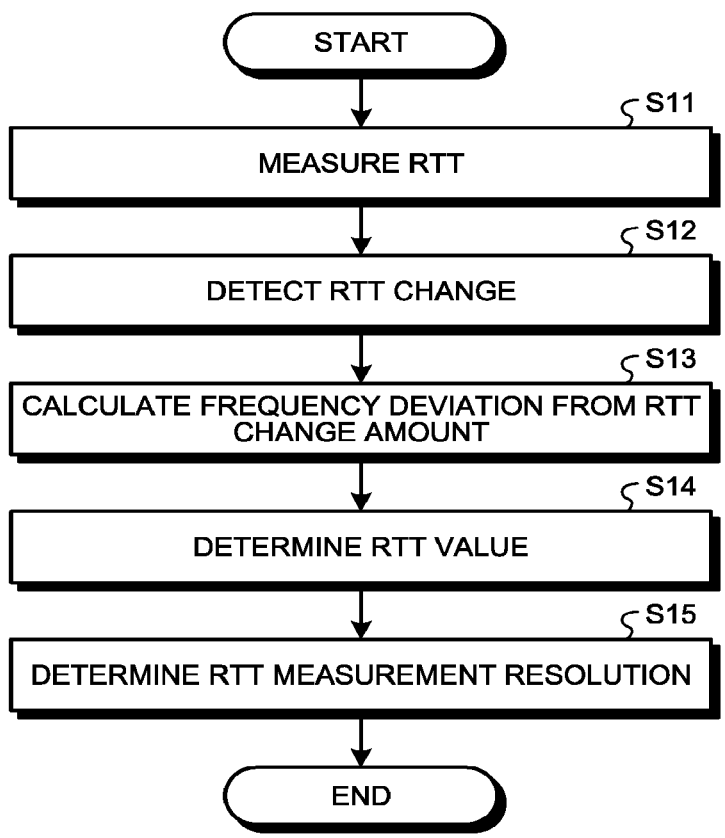
FIG. 20 is a flowchart illustrating an operation of a delay measuring device according to the first embodiment.

FIG. 20 is a flowchart illustrating operations of the delay measuring device 1 according to the first embodiment. In the delay measuring device 1, the RTT measuring unit 17 acquires, from the OTU2 OH generation unit 12, time point information about when an OTU2 frame is transmitted, acquires, from the OTU2 OH termination unit 15, time point information about when an OTU2 frame is received from the measurement object device 3, and measures the RTT from a difference between the one time point information and the other (step S11). The RTT change detection unit 18 detects an RTT change from a plurality of RTT values that are measurement results measured by the RTT measuring unit 17 a number of times (step S12). Further, the RTT change detection unit 18 calculates the frequency deviation of frame transmission frequencies between the delay measuring device 1 and the measurement object device 3, from an RTT change amount based on the plurality of RTT values (step S13). Based on the RTT change detected by the RTT change detection unit 18, the RTT determination unit 19 determines an RTT value representing an RTT between the delay measuring device 1 and the measurement object device 3, from the plurality of RTT values (step S14). Then, the measurement resolution determination unit 20 determines the RTT measurement resolution from the frequency deviation calculated by the RTT change detection unit 18 (step S15).

Figure 21:
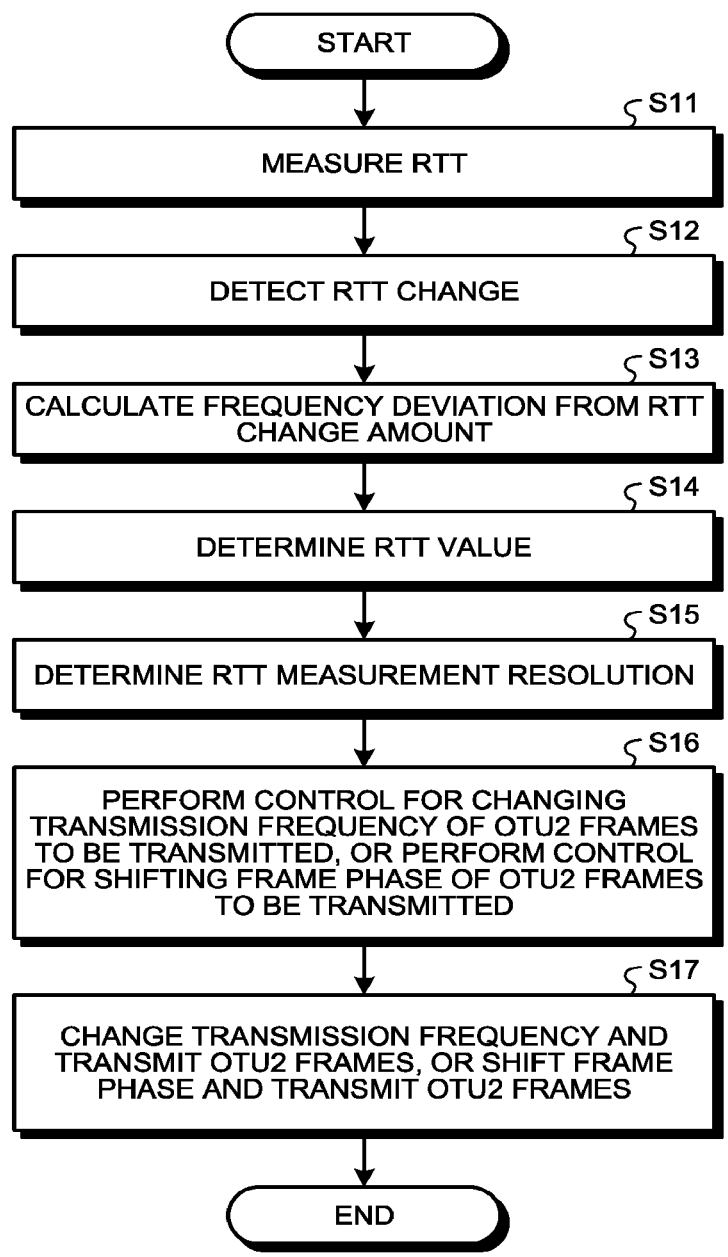
FIG. 21 is a flowchart illustrating an operation of a delay measuring device according to the second embodiment or a delay measuring device according to the third embodiment, in a case where it performs control onto an OTU2 frame to be transmitted from its own device.

FIG. 21 is a flowchart illustrating operations of the delay measuring device 1a according to the second embodiment and the delay measuring device 1c according to the third embodiment, in a case where it performs control onto the OTU2 frames to be transmitted from its own device. The processes from the step S11 to the step S15 are the same as those of FIG. 20. In the case of the second embodiment, the transmission frequency changing unit 21 of the delay measuring device 1a performs control for changing the transmission frequency of the OTU2 frames to be transmitted from the transmission unit 13a. Alternatively, in the case of the third embodiment, the transmission frame phase changing unit 22 of the delay measuring device 1c performs control for shifting the frame phase of the OTU2 frames to be transmitted from the transmission unit 13c (step S16). In the second embodiment, the transmission unit 13a of the delay measuring device 1a changes the transmission frequency and transmits the OTU2 frames, under the control of the transmission frequency changing unit 21. Alternatively, in the third embodiment, the transmission unit 13c of the delay measuring device 1c shifts the frame phase and transmits the OTU2 frames, under the control of the transmission frame phase changing unit 22 (step S17).

Figure 22:
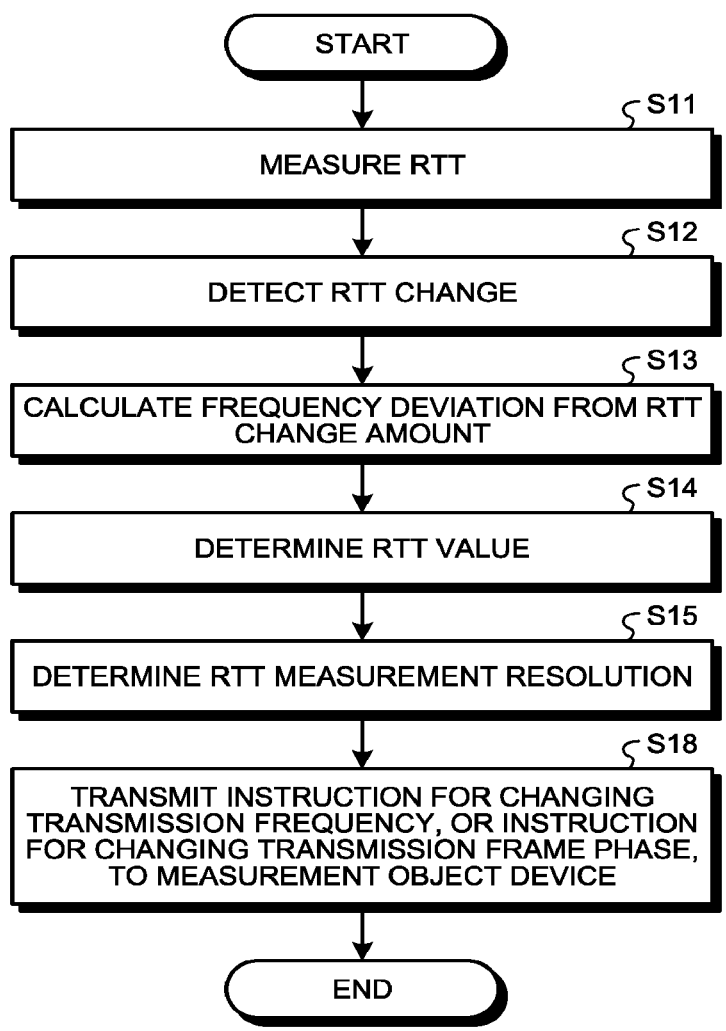
FIG. 22 is a flowchart illustrating an operation of a delay measuring device according to the second embodiment or a delay measuring device according to the third embodiment, in a case where it performs control onto an OTU2 frame transmitted from a measurement object device.

FIG. 22 is a flowchart illustrating operations of the delay measuring device 1b according to the second embodiment and the delay measuring device 1d according to the third embodiment, in a case where it performs control onto the OTU2 frames to be transmitted from a measurement object device. The processes from the step S11 to the step S15 are the same as those of FIG. 20. In the case of the second embodiment, the transmission unit 13b of the delay measuring device 1b transmits an instruction for changing the transmission frequency to the measurement object device 3a. Alternatively, in the case of the third embodiment, the transmission unit 13d of the delay measuring device 1d transmits an instruction for changing the transmission frame phase to the measurement object device 3b (step S18).

Figure 23:
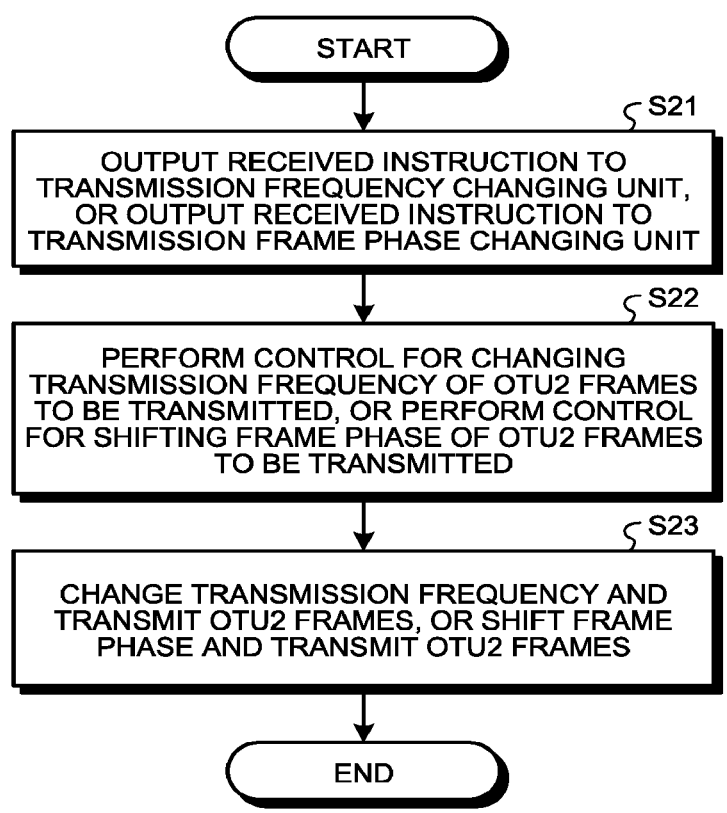
FIG. 23 is a flowchart illustrating an operation of a measurement object device according to the second embodiment or a measurement object device according to the third embodiment, in a case where it performs control onto an OTU2 frame to be transmitted from its own device.

FIG. 23 is a flowchart illustrating operations of the measurement object device 3a according to the second embodiment and the measurement object device 3b according to the third embodiment, in a case where it performs control onto the OTU2 frames to be transmitted from its own device. In the case of the second embodiment, the reception unit 31a of the measurement object device 3a outputs an instruction received from the delay measuring device 1b, to the transmission frequency changing unit 37. Alternatively, in the case of the third embodiment, the reception unit 31b of the measurement object device 3b outputs an instruction received from the delay measuring device 1d, to the transmission frame phase changing unit 38 (step S21). In the second embodiment, the transmission frequency changing unit 37 of the measurement object device 3a performs control for changing the transmission frequency of the OTU2 frames to be transmitted from the transmission unit

36a, in accordance with the instruction from the delay measuring device 1b. Alternatively, in the third embodiment, the transmission frame phase changing unit 38 of the measurement object device 3b performs control for shifting the frame phase of the OTU2 frames to be transmitted from the transmission unit 36b, in accordance with the instruction from the delay measuring device 1d (step S22). In the second embodiment, the transmission unit 36a of the measurement object device 3a changes the transmission frequency and transmits the OTU2 frames, under the control of the transmission frequency changing unit 37. Alternatively, in the third embodiment, the transmission unit 36b of the measurement object device 3b shifts the frame phase and transmits the OTU2 frames, under the control of the transmission frame phase changing unit 38 (step S23).

Figure 24:
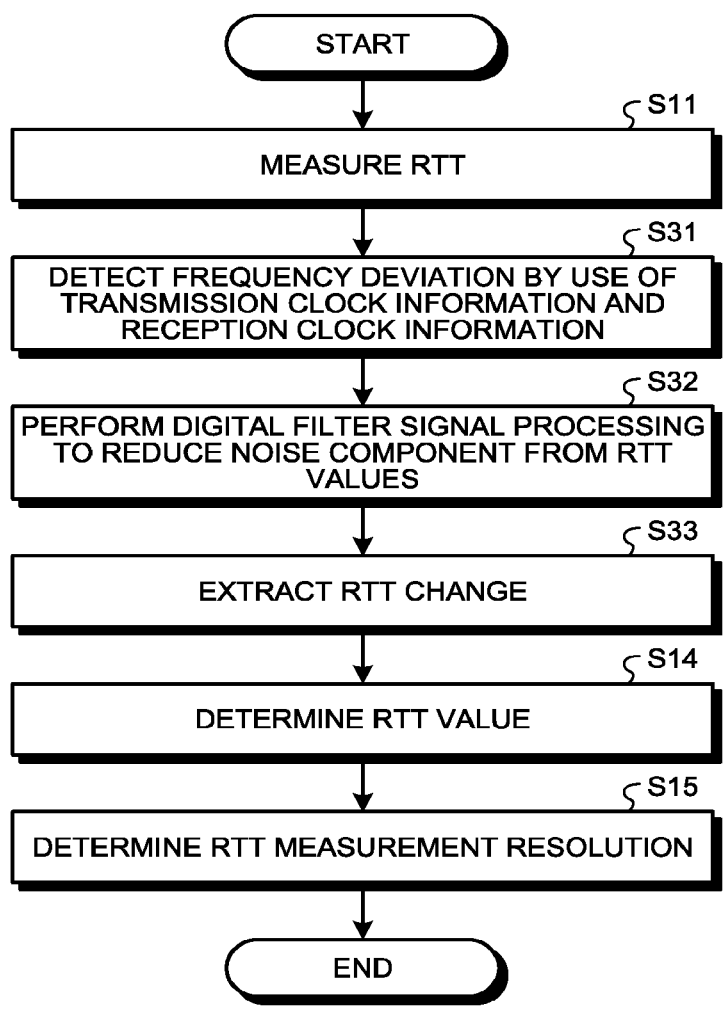
FIG. 24 is a flowchart illustrating an operation of a delay measuring device according to the fourth embodiment, in which a noise component is reduced from an RTT value.

FIG. 24 is a flowchart illustrating operations of the delay measuring device 1e according to the fourth embodiment, in which a noise component is reduced from the RTT values. The process of the step S11 is the same as that of FIG. 20. The frequency deviation detection unit 23 of the delay measuring device 1e acquires transmission clock information from the transmission unit 13e, acquires reception clock information from the reception unit 14a, and detects the frequency deviation of frame transmission frequencies between its own device and the measurement object device 3 by use of the acquired transmission clock information and reception clock information (step S31). The RTT change detection unit 18a performs a digital filter signal processing by use of the RTT values measured by the RTT measuring unit 17 and the frequency deviation detected by the frequency deviation detection unit 23, to reduce a noise component from the RTT values measured by the RTT measuring unit 17 (step S32). The RTT change detection unit 18a detects an RTT change from measurement results measured by the RTT measuring unit 17 a number of times, which are a number RTT values that have the noise component reduced by the digital filter signal processing, (step S33). The processes of the following steps S14 and S15 are the same as those of FIG. 20.

Next, an explanation will be given for the hardware configuration of the delay measuring device 1. In the delay measuring device 1, the transmission unit 13 and the reception unit 14 are realized by an interface circuit, such as an OTN communication interface card, for example. Further, the OTU2 OH generation unit 12 and the OTU2 OH termination unit 15 are realized by a driver circuit, for example. The Client multiplex storage unit 11 is realized by a multiplex circuit, for example. The Client separation unit 16 is realized by a separation circuit, for example. In the following description, an explanation will be given for a part, of a configuration of the delay measuring device 1, including the RTT measuring unit 17, the RTT change detection unit 18, the RTT determination unit 19 and the measurement resolution determination unit 20.

In the delay measuring device 1, each function of the RTT measuring unit 17, the RTT change detection unit 18, the RTT determination unit 19 and the measurement resolution determination unit 20 is realized by a processing circuit. Specifically, the delay measuring device 1 includes a processing circuit configured to measure the RTT, detect an RTT change, calculate the frequency deviation, determine an RTT value, and determine the RTT measurement resolution. The processing circuit may be formed in dedicated hardware, or may be formed of a CPU (Central Processing Unit) and a memory, where the CPU is configured to execute a program stored in the memory.

Figure 25:
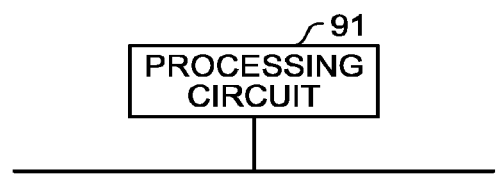
FIG. 25 is a diagram illustrating an example of a case where a processing circuit of the delay measuring device according to the first embodiment is constructed of a dedicated hardware.

FIG. 25 is a diagram illustrating an example of a case where the processing circuit of the delay measuring device 1 according to the first embodiment is configured in dedicated hardware. In a case where the processing circuit is a dedicated hardware, the processing circuit 91 illustrated in FIG. 25 corresponds to a single circuit, a composite circuit, a programmed processor, a parallel-programmed processor, an ASIC (Application Specific Integrated Circuit), an FPGA (Field Programmable Gate Array), or a combination thereof, for example. The functions of the RTT measuring unit 17, the RTT change detection unit 18, the RTT determination unit 19 and the measurement resolution determination unit 20 may be respectively realized in the corresponding processing circuits 91, or their functions may be realized collectively in a processing circuit 91.

Figure 26:
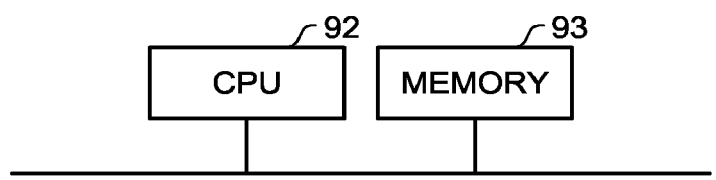
FIG. 26 is a diagram illustrating an example of a case where a processing circuit of the delay measuring device according to the first embodiment is constructed of a CPU and a memory.

FIG. 26 is a diagram illustrating an example of a case where the processing circuit of the delay measuring device 1 according to the first embodiment is constructed of a CPU and a memory. In a case where the processing circuit is circuitries of a CPU 92 and a memory 93, the functions of the RTT measuring unit 17, the RTT change detection unit 18, the RTT determination unit 19 and the measurement resolution determination unit 20 are realized by software, firmware, or a combination of software and firmware. The software or firmware is described as programs, and stored in the memory 93. In the processing circuit, the CPU 92 reads and executes the programs stored in the memory 93, and thereby realizes the functions of respective units. Specifically, the delay measuring device 1 is equipped with the memory 93 that stores programs having a step of measuring the RTT, a step of detecting an RTT change, a step of calculating the frequency deviation, a step of determining an RTT value and a step of determining the RTT measurement resolution executed as a result when the execution is realized by the processing circuit. In other words, these programs are supposed to cause a computer to conduct sequences and methods in the RTT measuring unit 17, the RTT change detection unit 18, the RTT determination unit 19 and the measurement resolution determination unit 20. Here, the CPU 92 may be formed in a central processing device, processing device, computing device, microprocessor, microcomputer, processor, DSP (Digital Signal Processor), or the like. Further, for example, the memory 93 corresponds to: a nonvolatile or volatile semiconductor memory, such as a RAM (Random Access Memory), ROM (Read Only Memory), flash memory, EPROM (Erasable Programmable ROM), or EEPROM (Electrically EPROM); magnetic disk; flexible disk; optical disk; compact disk; mini disk; or DVD (Digital Versatile Disc).

Here, as to the functions of the RTT measuring unit 17, the RTT change detection unit 18, the RTT determination unit 19 and the measurement resolution determination unit 20, a part thereof may be realized by dedicated hardware and another part thereof may be realized by software or firmware. For example, the functions of the RTT measuring unit 17 and the RTT change detection unit 18 can be realized by the processing circuit 91 as a dedicated hardware, and the functions of the RTT determination unit 19 and the measurement resolution determination unit 20 can be realized by the CPU 92 reading and executing the programs stored in the memory 93.

In this way, the processing circuit can realize the respective functions described above based on hardware, software, firmware, or a combination thereof.

Here, the configuration of the delay measuring device 1 according to the first embodiment has been described as an example, but the delay measuring devices 1a to 1e according to the second to fourth embodiments are also realized by a hardware configuration similar to that described above. In the second to fourth embodiments, the transmission unit and the reception unit denoted by reference symbols different from those of the first embodiment are realized by an interface circuit such as an OTN communication interface card, for example, as with the transmission unit 13 and the reception unit 14. Further, the transmission frequency changing unit 21, the transmission frame phase changing unit 22 and the frequency deviation detection unit 23 are realized by a hardware configuration illustrated in FIGS. 25 and 26.

Further, in the measurement object device 3, the transmission unit 36 and the reception unit 31 are realized by an interface circuit such as an OTN communication interface card, for example. Further, the OTU2 OH generation unit 35 and the OTU2 OH termination unit 32 are realized by a driver circuit, for example. The Client multiplex storage unit 34 is realized by a multiplex circuit, for example. The Client separation unit 33 is realized by a separation circuit, for example. The transmission unit and the reception unit denoted by reference symbols different from those of the first embodiment are realized by an interface circuit such as an OTN communication interface card, for example, as with the transmission unit 36 and the reception unit 31. Further, the transmission frequency changing unit 37 and the transmission frame phase changing unit 38 are realized by a hardware configuration illustrated in FIGS. 25 and 26.

The configurations illustrated in the above embodiments are examples of the contents of the present invention, and they can be combined with other publicly known techniques. Further, a part of the configuration can be omitted or modified without departing from the scope of the present invention.

REFERENCE SIGNS LIST 1, 1a, 1b, 1c, 1d, 1e delay measuring device; 3, 3a, 3b measurement object device; 11 Client multiplex storage unit; 12 OTU2 OH generation unit; 13, 13a, 13b, 13c, 13d, 13e transmission unit; 14, 14a reception unit; 15 OTU2 OH termination unit; 16 Client separation unit; 17 RTT measuring unit; 18, 18a RTT change detection unit; 19 RTT determination unit; 20 measurement resolution determination unit; 21 transmission frequency changing unit; 22 transmission frame phase changing unit; 23 frequency deviation detection unit; 31, 31a, 31b reception unit; 32 OTU2 OH termination unit; 33 Client separation unit; 34 Client multiplex storage unit; 35 OTU2 OH generation unit; 36, 36a, 36b transmission unit; 37 transmission frequency changing unit; 38 transmission frame phase changing unit.

The invention claimed is:

1. A delay measuring device of a communication system that includes the delay measuring device sequentially transmitting and receiving frames having a known frame length, and a measurement object device serving as an object for measuring a round trip time by the delay measuring device, the delay measuring device comprising:
 a round trip time meter to measure the round trip time with respect to the measurement object device a number of times using information for delay measurement in the frame;
 a round trip time change detector to detect a change of a value of the round trip time, based on a plurality of values of the round trip time measured, and to calculate a frequency deviation of frame transmission frequencies between the delay measuring device and the measurement object device;
 a processing circuit
  to determine the value of the round trip time to be adopted, from among the values of the round trip time, based on the change of the value of the round trip time that is in a direction opposite to a trend of previous values of round trip time,
  to determine a round trip time measurement resolution based on the frequency deviation, and
  to output the value of the round trip time and the round trip time measurement resolution to an external device.

2. The delay measuring device according to claim 1, wherein the processing circuit determines, when the values of the round trip time measured a number of times repeat a change of continuous decrease and subsequent increase, the value of the round trip time at a timing before the increase to be adopted, and determines, when the values of the round trip time measured the number of times repeat the change of continuous increase and subsequent decrease, the value of the round trip time at a timing of having made the decrease to be adopted.

3. The delay measuring device according to claim 1, wherein the processing circuit determines, when the values of the round trip time measured a number of times are detected as showing a continuous decrease and subsequently an increase corresponding to the frame length, the value of the round trip time at a timing before the increase to be adopted, and determines, when the values of the round trip time measured the number of times are detected as showing a continuous increase and subsequently a decrease corresponding to the frame length, the value of the round trip time at a timing of having made the decrease to be adopted.

4. The delay measuring device according to claim 1, wherein the processing circuit determines that a smallest value is adopted from among the values of the round trip time.

5. The delay measuring device according to claim 1, comprising a transmission frequency changer to perform control for changing a transmission period of frames to be transmitted from its own device, based on the frequency deviation and the round trip time measurement resolution.

6. The delay measuring device according to claim 1, comprising a transmission frame phase changer to perform control for changing a phase of a frame to be transmitted from its own device, based on the frequency deviation and the round trip time measurement resolution.

7. The delay measuring device according to claim 1, comprising a transmitter to instruct the measurement object device to change a transmission period of a transmission frame based on the frequency deviation and the round trip time measurement resolution.

8. The delay measuring device according to claim 1, comprising a transmitter to instruct the measurement object device to change a phase of a transmission frame based on the frequency deviation and the round trip time measurement resolution.

9. The delay measuring device according to claim 1, comprising a frequency deviation detector to acquire clock information from a transmitter to transmit a frame to the measurement object device, and from a receiver to receive the frame transmitted from the measurement object device, and detect the frequency deviation of the frame transmission frequencies between its own device and the measurement object device using the acquired clock information.

10. The delay measuring device according to claim 9, wherein the round trip time change detector performs a digital filter signal processing by use of a number of values of the round trip time measured by the round trip time meter, and a frequency deviation detected by the frequency deviation detector, thereby to reduce a noise component contained in a value of the round trip time.

11. The delay measuring device according to claim 10, wherein the processing circuit determines a value of the round trip time to be adopted, based on a change of a value of the round trip time that has a noise component reduced by the round trip time change detector.

12. A measurement object device comprising a transmission frequency changer to perform control for changing the transmission period of frames to be transmitted from its own device, based on an instruction from the delay measuring device according to claim 7.

13. A measurement object device comprising a transmission frame phase changer to perform control for changing the phase of the frame to be transmitted from its own device, based on an instruction from the delay measuring device according to claim 8.

14. A communication system comprising a delay measuring device and a measurement object device, the delay measuring device sequentially transmitting and receiving frames having a known frame length, and the measurement object device serving as an object for measuring a round trip time by the delay measuring device, the delay measuring device comprising:
a round trip time meter to measure the round trip time with respect to the measurement object device a number of times using information for delay measurement in a frame;
a round trip time change detector to detect a change of a value of the round trip time, based on a plurality of values of the round trip time measured, and calculates a frequency deviation of frame transmission frequencies between the delay measuring device and the measurement object device;
a processing circuit
to determine the value of the round trip time to be adopted, from among the values of the round trip time, based on the change of the value of the round trip time that is in a direction opposite to a trend of previous values of round trip time,
to determine a round trip time measurement resolution based on the frequency deviation, and
to output the value of the round trip time and the round trip time measurement resolution to an external device, wherein the delay measuring device further includes a transmitter to instruct the measurement object device to change a transmission period of a transmission frame based on the frequency deviation and the round trip time measurement resolution, and
the measurement object device comprising a transmission frequency changer to perform control for changing the transmission period of frames to be transmitted from the measurement object device, based on an instruction from the delay measuring device.

15. A communication system comprising a delay measuring device and a measurement object device, the delay measuring device sequentially transmitting and receiving frames having a known frame length, and the measurement object device serving as an object for measuring a round trip time by the delay measuring device, the delay measuring device comprising:
a round trip time meter to measure a round trip time with respect to the measurement object device a number of times using information for delay measurement in a frame;
a round trip time change detector to detect a change of a value of the round trip time, based on a plurality of values of the round trip time measured, and calculates a frequency deviation of frame transmission frequencies between the delay measuring device and the measurement object device;
a processing circuit
to determine the value of the round trip time to be adopted, from among the values of the round trip time, based on the change of the value of the round trip time that is in a direction opposite to a trend of previous values of round trip time,
to determine a round trip time measurement resolution based on the frequency deviation, and
to output the value of the round trip time and the round trip time measurement resolution to an external device, wherein the delay measuring device further includes a transmitter to instruct the measurement object device to change a phase of a transmission frame based on the frequency deviation and the round trip time measurement resolution, and
the measurement object device includes a transmission frame phase changer cha to perform control for changing the phase of the frame to be transmitted from the measurement object device, based on an instruction from the delay measuring device.

* * * * *